United States Patent
Iwai et al.

(10) Patent No.: US 11,553,437 B2
(45) Date of Patent: Jan. 10, 2023

(54) TERMINAL AND TRANSMISSION METHOD

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Tetsuya Yamamoto, Kanagawa (JP); Tomoya Nunome, Ishikawa (JP); Tomofumi Takata, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/049,433

(22) PCT Filed: Apr. 5, 2019

(86) PCT No.: PCT/JP2019/015067
§ 371 (c)(1),
(2) Date: Oct. 21, 2020

(87) PCT Pub. No.: WO2019/216073
PCT Pub. Date: Nov. 14, 2019

(65) Prior Publication Data
US 2021/0250870 A1    Aug. 12, 2021

(30) Foreign Application Priority Data

May 8, 2018  (JP) .............................. JP2018-090120
Jul. 18, 2018  (JP) .............................. JP2018-135011

(51) Int. Cl.
*H04W 52/14*    (2009.01)
*H04W 24/08*    (2009.01)
(Continued)

(52) U.S. Cl.
CPC ......... *H04W 52/146* (2013.01); *H04W 24/08* (2013.01); *H04W 52/20* (2013.01); *H04W 72/1289* (2013.01)

(58) Field of Classification Search
CPC ........... H04W 52/00–60; H04W 52/20; H04W 52/146; H04W 24/08; H04W 72/1289
See application file for complete search history.

(56) References Cited

U.S. PATENT DOCUMENTS

2010/0195575 A1* 8/2010 Papasakellariou .... H04L 5/0057
370/328
2011/0274099 A1* 11/2011 Kwon ..................... H04L 5/003
370/338
(Continued)

FOREIGN PATENT DOCUMENTS

WO    WO 2019137344 A1    7/2019

OTHER PUBLICATIONS

Extended European Search Report dated May 25, 2021, for the corresponding European Patent Application No. 19799249.8, 12 pages.

(Continued)

*Primary Examiner* — Raymond S Dean
(74) *Attorney, Agent, or Firm* — Seed IP Law Group LLP

(57) ABSTRACT

Provided is a terminal which can suitably transmit an uplink signal. In a terminal (100), a PC parameter control unit (104) sets a first power control parameter corresponding to a first service, when a prescribed condition relating to a control channel used for transmission of uplink signal allocation is met, and sets a second power control parameter corresponding to a second service, when the prescribed condition is not met. A transmission unit (109) transmits the uplink signal by using transmission power calculated by using the first power control parameter or the second power control parameter.

12 Claims, 14 Drawing Sheets

| | j | $P_{O\_PUSCH,f,c}(j)$ | $\alpha_{f,c}(j)$ |
|---|---|---|---|
| PC parameter set #B for eMBB → | 0 | −80dBm | 0.6 |
| | 1 | −70dBm | 0.7 |
| | 2 | −60dBm | 0.8 |
| | ⋮ | ⋮ | ⋮ |
| PC parameter set #A for URLLC → | J−1 | −50dBm | 1.0 |

(51) Int. Cl.
*H04W 52/20* (2009.01)
*H04W 72/12* (2009.01)

(56) References Cited

U.S. PATENT DOCUMENTS

| | | | | |
|---|---|---|---|---|
| 2015/0312071 | A1* | 10/2015 | Chen | H04L 1/0031 |
| | | | | 370/329 |
| 2016/0226649 | A1* | 8/2016 | Papasakellariou | H04L 1/08 |
| 2016/0227491 | A1* | 8/2016 | Park | H04W 52/221 |
| 2017/0367110 | A1 | 12/2017 | Li et al. | |
| 2018/0049165 | A1* | 2/2018 | Byun | H04W 72/0446 |
| 2018/0227156 | A1* | 8/2018 | Papasakellariou | H04B 7/0456 |
| 2018/0249458 | A1* | 8/2018 | He | H04L 5/0057 |
| 2018/0376464 | A1* | 12/2018 | Hosseini | H04L 1/1822 |
| 2019/0068331 | A1* | 2/2019 | Lee | H04L 1/18 |
| 2019/0081753 | A1* | 3/2019 | Jung | H04B 7/063 |
| 2019/0159194 | A1* | 5/2019 | Huang | H04L 5/0053 |
| 2019/0261281 | A1* | 8/2019 | Jung | H04W 52/146 |
| 2019/0363832 | A1* | 11/2019 | Yang | H04L 1/18 |
| 2020/0052770 | A1* | 2/2020 | Chen | H04B 7/0626 |
| 2020/0344699 | A1 | 10/2020 | Hu et al. | |

OTHER PUBLICATIONS

Huawei, HiSilicon, "Compact DCI design for URLLC," R1-1803276, Agenda Item: 7.2.2, 3GPP TSG RAN WG1 Meeting #92, Athens, Greece, Feb. 26-Mar. 2, 2018, 5 pages.
Huawei, HiSilicon, "UL multiplexing between URLLC and eMBB," R1-1803659, Agenda Item: 7.2.4, 3GPP TSG RAN WG1 Meeting #92bis, Sanya, China, Apr. 16-20, 2018, 8 pages.
3GPP TR 38.913 V14.3.0, "3rd Generation Partnership Project; Technical Specification Group Radio Access Network; Study on Scenarios and Requirements for Next Generation Access Technologies; (Release 14)," Jun. 2017, 39 pages.
3GPP TS 38.212 V15.1.1, "3rd Generation Partnership Project; Technical Specification Group Radio Access Network; NR; Multiplexing and channel coding (Release 15)," Apr. 2018, 94 pages.
3GPP TS 38.213 V15.1.0, "3rd Generation Partnership Project; Technical Specification Group Radio Access Network; NR; Physical layer procedures for control (Release 15)," Mar. 2018, 77 pages.
3GPP TS 38.214 V15.2.0, "3rd Generation Partnership Project; Technical Specification Group Radio Access Network; NR; Physical layer procedures for data (Release 15)," Jun. 2018, 94 pages.
ASUSTeK, "Power control details for multiplexing UL eMBB and URLLC," R1-1804084, Agenda Item: 7.2.4, 3GPP TSG RAN WG1 Meeting #92bis, Sanya, China, Apr. 16-20, 2018, 3 pages.
Ericsson, "Indication of URLLC Configuration," R1-1803936, Agenda Item: 7.2.5, 3GPP TSG-RAN Meeting #92b, Sanya, P.R. China, Apr. 16-20, 2018, 3 pages.
Huawei, HiSilicon, "Summary of 7.2.2 Study of necessity of a new DCI format," R1-1805630, Agenda Item: 7.2.2, 3GPP TSG RAN WG1 Meeting #92bis, Sanya, China, Apr. 16-20, 2018, 24 pages.
Huawei, HiSilicon, "Summary of remaining issues on pre-emption indication with TP," R1-1803662, Agenda Item: 7.1.3.3.6, 3GPP TSG RAN WG1 Meeting #92bis, Sanya, China, Apr. 16-20, 2018, 3 pages.
International Search Report, dated Jun. 25, 2019, for corresponding International Application No. PCT/JP2019/015067, 4 pages.
NTT Docomo, Inc., "Low latency uplink for URLLC," R1-1705751, Agenda Item: 8.1.3.2.5, 3GPP TSG RAN WG1 Meeting #88bis, Spokane, USA, Apr. 3-7, 2017, 4 pages.
Panasonic, "Discussion on uplink power control for NR URLLC," R1-1806179, Agenda Item: 7.2.2, 3GPP TSG RAN WG1 Meeting #93, Busan, Korea, May 21-25, 2018, 2 pages.
Panasonic, "On NR URLLC L1 enhancements," R1-1808827, Agenda Item: 7.2.6.1, 3GPP TSG RAN WG1 Meeting #94, Gothenburg, Sweden, Aug. 20-24, 2018, 8 pages.
TCL Communication, "Multiplexing of UL Transmissions with Different Reliabilities," R1-1805098, Agenda Item: 7.2.4, 3GPP TSG RAN WG1 Meeting 92B, Sanya, China, Apr. 16-20, 2018, 5 pages.
Vivo, "Discussion on handling UL multiplexing of transmissions with different reliability requirements," R1-1803848, Agenda Item: 7.2.1, 3GPP TSG RAN WG1 Meeting #92bis, Sanya, China, Apr. 16-20, 2018, 10 pages.
Vivo, "Summary of handling UL multiplexing of transmission with different reliability requirements," R1-1803359, Agenda Item: 7.2. 4, 3GPP TSG RAN WG1 Meeting #92, Athens, Greece, Feb. 26-Mar. 2, 2018, 4 pages.
Vivo, "Other aspects for URLLC," Rl-1803849, Agenda Item: 7.2.5, 3GPP TSG RAN WG1 Meeting #92bis, Sanya, China, Apr. 16-20, 2018, (4 pages).

\* cited by examiner

| j | $P_{O\_PUSCH,f,c}(j)$ | $\alpha_{f,c}(j)$ |
|---|---|---|
| 0 | −80dBm | 0.6 |
| 1 | −70dBm | 0.7 |
| 2 | −60dBm | 0.8 |
| ⋮ | ⋮ | ⋮ |
| J−1 | −50dBm | 1.0 |

FIG. 1

| $j$ | $P_{O\_PUSCH,f,c}(j)$ | $\alpha_{f,c}(j)$ |
|---|---|---|
| 0 ← PC parameter set #B for eMBB | −80dBm | 0.6 |
| 1 | −70dBm | 0.7 |
| 2 | −60dBm | 0.8 |
| ⋮ | ⋮ | ⋮ |
| J−1 ← PC parameter set #A for URLLC | −50dBm | 1.0 |

FIG. 6

| MCS Index $I_{MCS}$ | Modulation Order $Q_m$ | Target code Rate $R$ x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

FIG. 7A

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 7B

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 7C

| j | $P_{O\_PUSCH,f,c}(j)$ | $\alpha_{f,c}(j)$ |
|---|---|---|
| 0 | −80dBm | 0.6 |
| 1 | −70dBm | 0.7 |
| 2 | −60dBm | 0.8 |
| ⋮ | ⋮ | ⋮ |
| J−3 | −60dBm | 0.9 |
| J−2 | −50dBm | 0.9 |
| J−1 | −50dBm | 1.0 |

PC parameter set #B for TRP#0 → 0
PC parameter set #B for TRP#1 → 1
PC parameter set #A for TRP#0 → J−2
PC parameter set #A For TRP#1 → J−1

FIG. 8

| | j | $P_{O\_PUSCH,f,c}(j)$ | $\alpha_{f,c}(j)$ |
|---|---|---|---|
| PC parameter set #B for eMBB → | 0 | −80dBm | 0.6 |
| | 1 | −70dBm | 0.7 |
| | 2 | −60dBm | 0.8 |
| | ⋮ | ⋮ | ⋮ |
| PC parameter set #A1 for CSI for URLLC → | J−2 | −50dBm | 0.9 |
| PC parameter set #A2 for ACK/NACK for URLLC → | J−1 | −50dBm | 1.0 |

FIG. 11

| | j | $P_{O\_PUSCH,f,c}(j)$ | $\alpha_{f,c}(j)$ |
|---|---|---|---|
| PC parameter set #B for eMBB → | 0 | −80dBm | 0.6 |
| | 1 | −70dBm | 0.7 |
| | 2 | −60dBm | 0.8 |
| | ⋮ | ⋮ | ⋮ |
| PC parameter set #A1 for UCI bits ≤ X8[bit] → | J−2 | −50dBm | 0.9 |
| PC parameter set #A2 for UCI bits > X8[bit] → | J−1 | −50dBm | 1.0 |

FIG. 12

| Combination | PC parameter set (Option 1) | PC parameter set (Option 2) |
|---|---|---|
| (1) UCI for eMBB on eMBB PUSCH | PC parameter set #B → 0 | PC parameter set #B → 0 |
| (2) UCI for URLLC on URLLC PUSCH | PC parameter set #A → J−1 | PC parameter set #A1 → J−1 |
| (3) UCI for URLLC on eMBB PUSCH | | PC parameter set #A2 → J−2 |
| (4) UCI for eMBB on URLLC PUSCH | | PC parameter set #A3 → J−3 |

FIG. 13

TERMINAL AND TRANSMISSION METHOD

TECHNICAL FIELD

The present disclosure relates to a terminal and a transmission method.

BACKGROUND ART

In the standardization of 5G, a new radio access technique (New Radio (NR)) that is not necessarily backward compatible with LTE/LTE-Advanced has been discussed in 3GPP.

In the NR, technical studies targeting Ultra-Reliable and Low Latency Communications (URLLC), which is one of the requirements of 5G, have been carried out. URLLC is required to satisfy at the same time the "high reliability" of a packet transmission error rate of $10^{-5}$ or less for a packet data amount of 32 bytes (packet transmission success rate of 99.999% or more) and the "low latency" of 1 ms or less for a radio interval (see Non-Patent Literature (hereinafter, referred to as "NPL") 1, for example).

In order to satisfy the requirements of URLLC mentioned above, it has been studied to transmit, in the transmission of an uplink channel (PUSCH: Physical Uplink Shared Channel) of URLLC data, the URLLC data by using a high transmission power (for example, power boosting) compared to an uplink channel of the other data (for example, see NPL 2)."

CITATION LIST

Non-Patent Literature

NPL 1
3GPP TR 38.913 V14.3.0, "Study on Scenarios and Requirements for Next Generation Access TEchnologies (Release 14)" (2017-06)
NPL 2
R1-1803359, "Summary on handling UL multiplexing of transmission with different reliability requirements", vivo, February 2018
NPL 3
3GPP TS 38.213 V15.1.0, "NR; Physical layer procedures for control (Release 15)" (2018-03)
NPL 4
3GPP TS 38.212 V15.1.1, "NR; Multiplexing and channel coding (Release 15)" (2018-04)
NPL 5
R1-1805630, "Summary of 7.2.2 Study of necessity of a new DCI format", Huawei, April 2018
NPL 6
3GPP TS38.214 V15.2.0, "NR; Physical layer procedures for data (Release 15)" (2018-06)

SUMMARY OF INVENTION

However, a method of transmitting PUSCH of URLLC has not been fully studied yet.

Non-limiting examples of the present disclosure facilitates providing a terminal and a transmission method that can transmit an uplink signal appropriately.

A terminal according to one example of the present disclosure includes: circuitry, which, in operation, configures a first power control parameter corresponding to a first service when a predetermined condition relating to a control channel to be used in transmission of assignment information of an uplink signal is satisfied, and configures a second power control parameter corresponding to a second service when the predetermined condition is not satisfied; and transmission circuitry, which, in operation, transmits the uplink signal using a transmission power calculated using the first power control parameter or the second power control parameter.

A transmission method according to one example of the present disclosure includes: configuring a first power control parameter corresponding to a first service when a predetermined condition relating to a control channel to be used in transmission of assignment information of an uplink signal is satisfied, and configuring a second power control parameter corresponding to a second service when the predetermined condition is not satisfied; and transmitting the uplink signal using a transmission power calculated using the first power control parameter or the second power control parameter.

It should be noted that these general or specific aspects may be implemented as a system, an apparatus, a method, an integrated circuit, a computer program, a storage medium, or any selective combination thereof.

According to one example of the present disclosure, it is possible to transmit an uplink signal appropriately.

Additional benefits and advantages of one general example of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 is a diagram showing an example of a PC parameter set.

FIG. 6 is a diagram showing a configuration example of PC parameter set numbers A and B according to Embodiment 1.

FIG. 7A is a diagram showing an example of an MCS table for URLLC.

FIG. 7B is a diagram showing an example of an MCS table for eMBB.

FIG. 7C is a diagram showing another example of an MCS table for eMBB.

FIG. 8 is a diagram showing a configuration example of PC parameter set numbers A and B according to Embodiment 1.

FIG. 11 is a diagram showing a configuration example of PC parameter set numbers according to Embodiment 2.

FIG. 12 is a diagram showing another configuration example of PC parameter set numbers according to Embodiment 2.

FIG. 13 is a diagram showing a further configuration example of PC parameter set numbers according to Embodiment 2.

DESCRIPTION OF EMBODIMENTS

Figure 2:
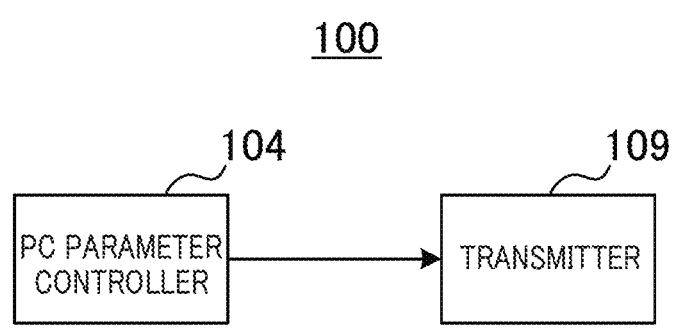
FIG. 2 is a block diagram showing a configuration example of a part of a terminal according to Embodiment 1.

Hereinafter, embodiments of the present disclosure will be described in detail with reference to the accompanying drawings.

Transmission power control (TPC) of PUSCH in a terminal (sometimes referred to as a User Equipment (UE)) for NR is performed in accordance with the following Equation 1, for example (see NPL 3, for example).

[1]

$$P_{PUSCH,f,c}(i, j, q_d, l) = \\ \min\{P_{CMAX,f,c}(i), P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l)\}$$

(Equation 1)

In Equation 1, $P_{PUSCH,f,c}(i, j, qd, l)$ represents PUSCH transmission power [dBm] at carrier number "f," serving cell number "c," Slot number "i," power control (PC) parameter set number "j," pathloss (PL) estimation reference signal (RS) number "$q_d$," and Closed loop process number "l"; $P_{CMAX,f,c}(i)$ represents maximum transmission power [dBm] of the terminal at Slot number i; $P_{O\_PUSCH,f,c}(j)$ represents target reception power [dBm] (Parameter value) at PC parameter set number j; $2^\mu \cdot M_{RB,f,c}^{PUSCH}(i)$ represents PUSCH transmission bandwidth [PRB] obtained by normalizing subcarrier spacing (SCS) to be applied to PUSCH at Slot number i with reference to 15 KHz SCS; $\alpha_{f,c}(j)$ represents a weighting factor (Parameter value) indicating pass loss compensation ratio at PC parameter set number j; $PL_{f,c}(q_d)$ represents a Pass Loss [dB] measured by a terminal from an RS of RS number $q_d$; $\Delta_{TF,f,c}(i)$ represents an offset [dB] depending on Modulation and Coding Scheme (MCS) of data to be transmitted at Slot number i; and $f_{f,c}(i, l)$ represents Closed loop correction value [dB] at Slot number i and Closed loop process number l.

In Equation 1, $P_{O\_PUSCH,f,c}(j)$ and $\alpha_{f,c}(j)$ are referred to as a "PC parameter set." For example, as shown in FIG. 1, values of PC parameter set for each PC parameter set number j are configured in advance from a base station (sometimes referred to as "eNB" or "gNB") to a terminal by, for example, a radio resource control (RRC) indication.

It has been studied to use, in an uplink transmission of URLLC data, a PC parameter set ($P_{O\_PUSCH,f,c}(j)$ and $\alpha_{f,c}(j)$) corresponding to a high transmission power compared to other service types (e.g., eMBB) in order to satisfy URLLC reliability requirements. For example, it has been studied to transmit URLLC data at a high transmission power compared to eMBB data by applying power boosting to the URLLC data.

PUSCH scheduling information (e.g., frequency resource allocation information, time resource allocation information, or MCS and the like) is referred to as downlink control information (DCI) and is transmitted from a base station to a terminal using Physical Downlink Control Channel (PDCCH). In addition, PDCCH used to indicate the PUSCH scheduling information is referred to as an "uplink grant (UL grant)."

In the NR, two types of DCI format, "DCI format 0_0" and "DCI format 0_1" are defined as the DCI format for UL grant (see, for example, NPL 4). DCI format 0_0 is also referred to as "fallback DCI." Since DCI format 0_0 does not include some of information included in DCI format 0_1, DCI format 0_0 has a small payload size compared to DCI format 0_1.

Further, PDCCH (e.g., UL grant) indicating scheduling information of URLLC data (sometimes referred to as PUSCH for URLLC) is also required to have high reliability and low latency that are equivalent to or better than those of the URLLC data. Here, the smaller the payload size is, the higher the coding gain becomes, thus making it possible to improve reliability. As such, it has been studied to use fallback DCI (e.g., DCI format 0_0) in a DCI format of a PDCCH indicating scheduling information of URLLC data (see, for example, NPL 5).

For example, DCI format 0_1 includes an SRS resource indicator (SRI) field. When DCI format 01 is used in a DCI format of UL grant, it is possible to indicate PC parameter set number j to a terminal by the SRI field. Therefore, a base station can indicate power boosting transmission of PUSCH for URLLC to the terminal using DCI format 01. In other words, the base station can use the SRI field included in DCI format 01 to explicitly indicate, to the terminal, PC parameter set number j corresponding to PC parameter set ($P_{O\_PUSCH,f,c}(j)$ and $\alpha_{f,c}(j)$) suitable for transmission power of PUSCH for URLLC.

On the other hand, the fallback DCI (e.g., DCI format 0_0) does not include the SRI field. When the SRI field is not included, that is, when UL grant that does not include information explicitly indicating the PC parameter set number is used, a fixed PC parameter set value (e.g., a PC parameter set value of j=0) is used, for example.

In this case, since the fixed PC parameter set value is applied to the terminal regardless of a service type (also referred to as a traffic type) such as, for example, URLLC and eMBB, uplink channel transmission power suitable for the service type cannot be configured. For example, when a parameter value for eMBB is configured to a fixed PC parameter set value, scheduling of URLLC data will result in a transmission power shortage, and URLLC quality requirements cannot be satisfied. On the other hand, when a parameter value for URLLC is configured to a fixed PC parameter set value, scheduling of eMBB data will result in excessive transmission power, which causes an increase in interfering and has concerns about deterioration of system performance.

As described above, a method of indicating, to a terminal, power boosting of PUSCH for URLLC in an UL grant that does not include information that explicitly indicates the PC parameter set number, for example, has not been fully discussed.

Therefore, in one example of the present disclosure, a method of appropriately configuring an uplink channel transmission power suitable for a service type such as, for example, URLLC and eMBB will be described.

Embodiment 1

[Overview of Communication System]

A communication system according to an embodiment of the present disclosure includes terminal 100 and base station 200. Terminal 100 transmits PUSCH using a predetermined transmission power based on a DCI included in an UL grant from base station 200. Base station 200 transmits an UL grant to terminal 100 and receives PUSCH from terminal 100.

FIG. 2 is a block diagram showing a configuration of a part of terminal 100 according to the embodiment of the present disclosure. In terminal 100 shown in FIG. 2, PC parameter controller 104 configures a first power control parameter corresponding to a first service (e.g., URLLC) when a predetermined condition relating to a control channel (e.g., UL grant) to be used in transmission of an uplink signal assignment is satisfied, and configures a second power control parameter corresponding to a second service (e.g., eMBB) when the predetermined condition is not satisfied. Transmitter 109 transmits an uplink signal using a transmission power calculated using the first power control parameter or the second power control parameter.

[Configuration of Terminal 100]

Figure 3:
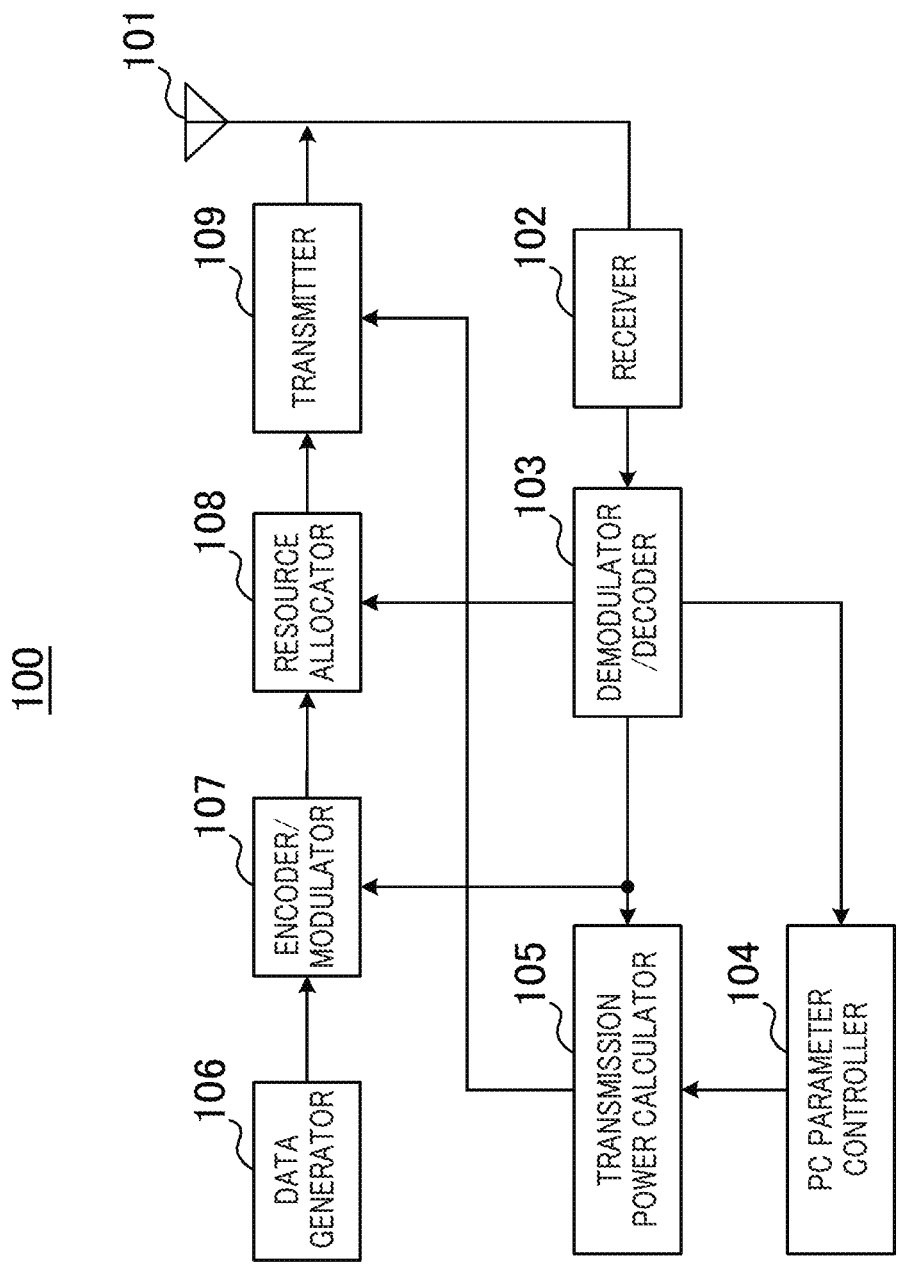
FIG. 3 is a block diagram showing a configuration example of the terminal according to Embodiment 1.

FIG. 3 is a block diagram showing a configuration example of terminal 100 according to the present embodiment.

Terminal 100 shown in FIG. 3 includes antenna 101, receiver 102, demodulator/decoder 103, PC parameter controller 104, transmission power calculator 105, data generator 106, encoder/modulator 107, resource allocator 108, and transmitter 109.

Receiver 102 receives via antenna 101 a signal transmitted from base station 200, performs reception processing such as down-conversion or analog-to-digital (A/D) conversion on a received signal, and outputs a received signal after the reception processing to demodulator/decoder 103.

Demodulator/decoder 103 performs demodulation and decoding on the received signal to be inputted from Receiver 102, extracts (receives) an UL grant (PDCCH or NR-PDCCH) addressed to Terminal 100 from a result of the decoding, and decodes a DCI for scheduling PUSCH included in the extracted UL grant. Demodulator/decoder 103 outputs the decoded DCI to PC parameter controller 104, transmission power calculator 105, encoder/modulator 107, and resource allocator 108.

The DCI includes, for example, frequency resource information, time resource information, MCS, transmission power information, payload size, DCI scrambling sequence, retransmission control information, TPC command information, or the like. Here, the UL grant transmitted from base station 200 to terminal 100 uses a DCI format having a small payload size. The DCI format having the small payload size may be a DCI format having a payload size equal to that of DCI format 0_0 or less than that of DCI format 0_0, for example. In other words, the UL grant transmitted from base station 200 to terminal 100 does not include information explicitly indicating PC parameter set number j.

Note that DCIs including all pieces of control information need not be indicated to terminal 100 at the same time. For example, some DCI may be indicated to terminal 100 as cell common information or as quasi-static indication information. Further, some DCI is defined by specs as system common information, for example, and may not be indicated from base station 200 to terminal 100.

PC parameter controller 104 determines PC parameter set number j to be applied to PUSCH that has been scheduled, using the DCI inputted from demodulator/decoder 103.

PC parameter controller 104 outputs the determined PC parameter set number to transmission power calculator 105.

For example, when a predetermined condition is satisfied with respect to a UL grant to be used in transmission of PUSCH scheduling information (assignment information), PC parameter controller 104 determines that a PUSCH scheduled by the UL grant is PUSCH for URLLC. When PC parameter controller 104 determines that a PUSCH scheduled by the UL grant is a PUSCH for URLLC, PC parameter controller 104 configures PC parameter set number j=A that corresponds to URLLC. On the other hand, when the predetermined condition is not satisfied with respect to the UL grant, PC parameter controller 104 determines that a PUSCH scheduled by this UL grant is a PUSCH for the service type other than URLLC. When PC parameter controller 104 determines that a PUSCH scheduled by the UL grant is a PUSCH for the service type other than URLLC, PC parameter controller 104 configures PC parameter set number j=B that corresponds to the service type other than URLLC (e.g., eMBB).

In addition, a table of the PC parameter set (see, for example, FIG. 1) is configured in advance from base station 200 to terminal 100. Further, a parameter value corresponding to a transmission power value assuming URLLC is configured in PC parameter set of j=A, and a parameter value corresponding to a transmission power value assuming a service type other than URLLC (e.g., eMBB) is configured in PC parameter set of j=B. In other words, the transmission power value calculated using PC parameter set of j=A is greater than the transmission power value calculated using PC parameter set of j=B.

In addition, a method of selecting the PC parameter set number in PC parameter controller 104 will be described in detail later.

Transmission power calculator 105 calculates a PUSCH transmission power value at Slot number i, using an updated value (a control value such as +1 dB, −1 dB, etc.) of the Closed loop correction value included in the DCI inputted from demodulator/decoder 103 and PC parameter set number j inputted from PC parameter controller 104, in accordance with Equation 1, for example. Transmission power calculator 105 outputs the calculated PUSCH transmission power to transmitter 109.

In addition, transmission power calculator 105 may apply a predetermined fixed value (e.g., $q_d$=0, l=0) when PL estimation RS number $q_d$ and Closed loop process number l that are parameters other than slot number i and PC parameter set number j as shown in Equation 1 are not explicitly indicated by PC parameter controller 104. On the other hand, when PL estimation RS number $q_d$ and Closed loop process number l are explicitly indicated by PC parameter controller 104, transmission power calculator 105 configures the values indicated by PC parameter controller 104.

Data generator 106 generates data to be transmitted by terminal 100, and outputs the generated transmission data to encoder/modulator 107.

Encoder/modulator 107 performs coding and modulation on the transmission data inputted from data generator 106 based on the DCI inputted from the demodulator/decoder 103, and outputs the modulated data signal to resource allocator 108.

Resource allocator 108 assigns the modulated data signal inputted from encoder/modulator 107 to a predetermined radio resource (e.g., frequency resource and time resource) based on the DCI inputted from demodulator/decoder 103. Resource allocator 108 outputs the signal after the resource allocation to transmitter 109.

Transmitter 109 performs transmission processing such as digital-to-analog (D/A) conversion and up-conversion to the signal inputted from resource allocator 108. Transmitter 109 transmits the signal after the transmission processing to base station 200 via antenna 101 using the transmission power value inputted from transmission power calculator 105.

[Configuration of Base Station 200]

Figure 4:
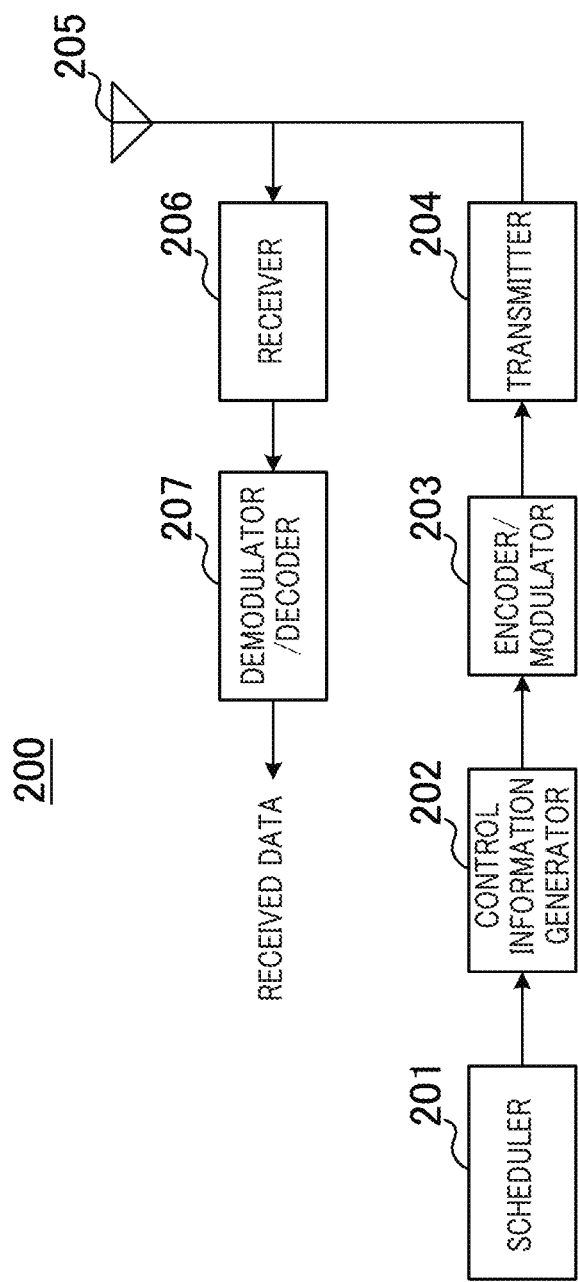
FIG. 4 is a block diagram showing a configuration example of a base station according to Embodiment 1.

FIG. 4 is a block diagram showing a configuration example of base station 200 according to the present embodiment.

Base station 200 shown in FIG. 4 includes scheduler 201, control information generator 202, encoder/modulator 203, transmitter 204, antenna 205, receiver 206, and demodulator/decoder 207.

Scheduler 201 determines radio resource allocation information (e.g., frequency resource allocation information, time resource allocation information, MCS, transmission power information, etc.) for PUSCH of terminal 100. For example, scheduler 201 may determine the radio resource allocation information based on quality information indicated from terminal 100 at a predetermined timing. Scheduler 201 outputs the determined radio resource allocation information and corresponding service type (e.g., URLLC or eMBB) to control information generator 202.

Control information generator 202 generates an UL grant including a DCI to be indicated to terminal 100, based on the radio resource allocation information and the service type that are inputted from scheduler 201. Control information generator 202 outputs the generated UL grant to the encoder/modulator 203. Here, the UL grant is a fallback DCI with a small payload size (e.g., DCI format 0_0), for example, and the UL grant does not include information that explicitly indicates the PC parameter set number.

Encoder/modulator 203 performs coding and modulation on the UL grant inputted from control information generator 202 and outputs the modulated UL grant to transmitter 204.

Transmitter 204 performs transmission processing such as D/A conversion, up-conversion, and amplification on the signal inputted from encoder/modulator 203, and transmits the signal after the transmission processing to terminal 100 via antenna 205.

Receiver 206 performs reception processing such as down-conversion or A/D conversion on the PUSCH transmitted from terminal 100 which has been received via antenna 205, and outputs the received signal after the reception processing to demodulator/decoder 207.

Demodulator/decoder 207 performs demodulation and decoding on the received signal inputted from receiver 206 and obtains the received data from terminal 100.

[Operation of Base Station and Terminal]

Operations of terminal 100 and base station 200 having the above configurations will be described in detail.

Figure 5:
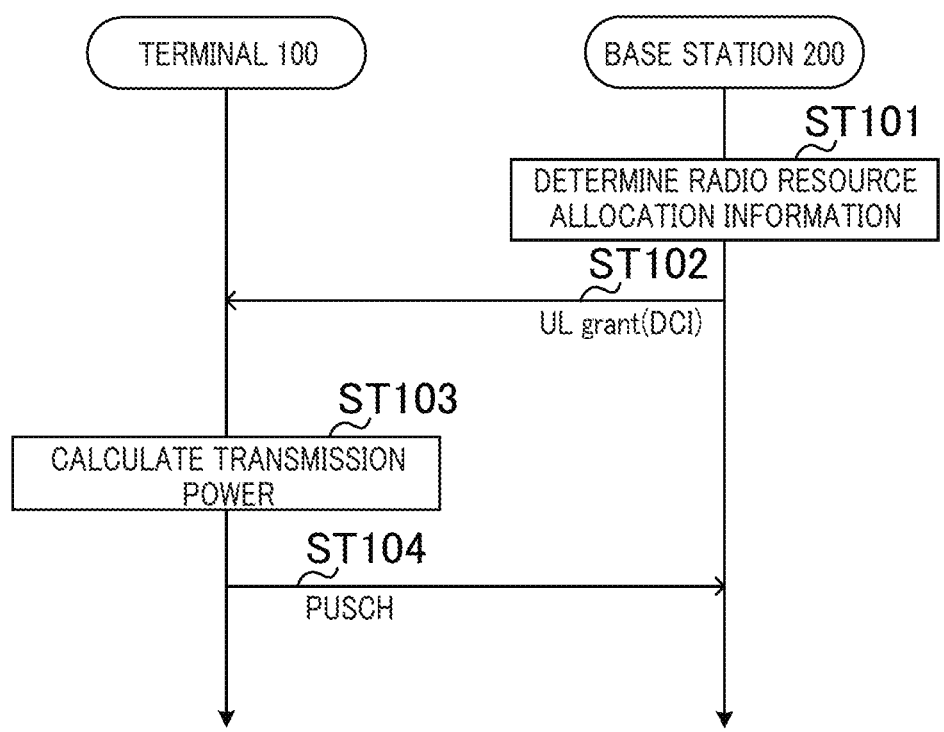
FIG. 5 is a sequence diagram showing exemplary operations of the terminal and the base station according to Embodiment 1.

FIG. 5 is a sequence diagram showing exemplary operations of terminal 100 (FIG. 3) and base station 200 (FIG. 4).

Base station 200 determines radio resource allocation information regarding an uplink signal (e.g., PUSCH) for terminal 100, and generates a DCI (ST101). Base station 200 transmits an UL grant including the generated DCI to terminal 100 (ST102).

Terminal 100 calculates a transmission power of PUSCH based on radio resource allocation data indicated by the DCI included in the UL grant from base station 200 (ST103). At this time, terminal 100 determines PC parameter set number j for calculating the transmission power of PUSCH for URLLC in accordance with whether or not a predetermined condition relating to an UL grant is satisfied.

Terminal 100 transmits the PUSCH to base station 200 using the calculated transmission power (ST104).

[Method of Selecting PC Parameter Set]

Next, a method of selecting a PC parameter set in PC parameter controller 104 of terminal 100 will be described.

When a predetermined condition relating to an UL grant (the details will be described later) is satisfied, PC parameter controller 104 of terminal 100 determines that the UL grant from base station 200 (see ST102 of FIG. 5, for example) is an UL grant to schedule URLLC data, and configures a PC parameter set value of PC parameter set number j=A that corresponds to URLLC.

On the other hand, when the predetermined condition relating to an UL grant is not satisfied, PC parameter controller 104 of terminal 100 determines that the UL grant from base station 200 is an UL grant to schedule data of another service type other than URLLC, and configures a PC parameter set value of PC parameter set number j=B that corresponds to the other service type other than URLLC.

Transmission power calculator 105 of terminal 100 calculates a transmission power of PUSCH using the configured PC parameter set number j, in accordance with Equation 1, for example.

Hereinafter, examples of the "predetermined condition" for determining whether or not it is an UL grant to schedule URLLC data will be described.

EXAMPLE 1

Payload Size of UL Grant

In Example 1, the predetermined condition is that the payload size of a DCI format used in an UL grant is different from a predetermined size. Or, in Example 1, the predetermined condition is that the payload size of a DCI format used in an UL grant is less than a predetermined size.

As described above, the smaller the payload size of an UL grant to schedule URLLC data, the higher the coding gain becomes, thus making it possible to improve reliability. Therefore, it can be considered that the UL grant used to schedule URLLC is configured with a format having a small payload.

For example, in Example 1, when a payload size of a DCI format used in an UL grant from base station 200 is different from a predetermined size or less than the predetermined size, PC parameter controller 104 determines that this UL grant is an UL grant to schedule URLLC. In other words, when the payload size of the DCI format is different from the predetermined size or less than the predetermined size, PC parameter controller 104 determines that the PUSCH scheduled by this UL grant is a PUSCH for URLLC (URLLC PUSCH).

For example, when the payload size of the UL grant detected by terminal 100 is different from the payload sizes of both DCI format 0_0 and DCI format 01 prescribed in an UL grant for PUSCH assuming eMBB, PC parameter controller 104 may determine that this UL grant is an UL grant to schedule PUSCH for URLLC.

Or, when the payload size of the UL grant detected by terminal 100 is less than the payload size of DCI format 0_0 corresponding to the fallback DCI, PC parameter controller 104 may determine that this UL grant is an UL grant to schedule PUSCH for URLLC.

When determined that the UL grant is an UL grant to schedule PUSCH for URLLC, PC parameter controller 104 selects a PC parameter set of PC parameter set number j=A that corresponds to URLLC.

On the other hand, when the payload size of the UL grant detected by terminal 100 is equal to the payload size of DCI format 0_0 or DCI format 01, PC parameter controller 104 determines that this UL grant is an UL grant to schedule data of a service type other than URLLC (e.g., PUSCH for eMBB). When determined that the UL grant is an UL grant to schedule data of a service type other than URLLC, PC parameter controller 104 selects a PC parameter set of PC parameter set number j=B that corresponds to the service type other than URLLC.

As described above, in Example 1, the PC parameter set number is implicitly indicated from base station 200 to terminal 100, in accordance with the payload size of the DCI format used in the UL grant.

EXAMPLE 2

Scrambling Sequence Used in UL Grant

In Example 2, the predetermined condition is that a scrambling sequence used in an UL grant is different from a predetermined sequence.

For example, when a terminal-specific scrambling sequence used in a DCI format of an UL grant is different from a predetermined terminal-specific sequence, PC parameter controller 104 determines that this UL grant is an UL grant to schedule URLLC data. In other words, when a terminal-specific scrambling sequence used in a DCI format of an UL grant is different from a predetermined terminal-specific sequence, PC parameter controller 104 determines that the PUSCH scheduled by this UL grant is a PUSCH for URLLC (URLLC PUSCH).

For example, in DCI format 0_0 or DCI format 01 prescribed in an UL grant for PUSCH assuming eMBB, Cell-Radio Network Temporary Identifier (C-RNTI) or Configured Scheduling-RNTI (CS-RNTI), etc. is used for the terminal-specific scrambling sequence.

For example, when the scrambling sequence used in the UL grant detected by terminal 100 is different from C-RNTI or CS-RNTI, PC parameter controller 104 determines that this UL grant is an UL grant to schedule PUSCH for URLLC, and selects a PC parameter set of PC parameter set number j=A that corresponds to URLLC.

On the other hand, when the scrambling sequence used in the UL grant detected by terminal 100 is C-RNTI or CS-RNTI, PC parameter controller 104 determines that this UL grant is an UL grant to schedule data of a service type other than URLLC, and selects a PC parameter set of PC parameter set number j=B that corresponds to the service type other than URLLC.

As described above, in Example 2, the PC parameter set number is implicitly indicated from base station 200 to terminal 100, in accordance with the scrambling sequence of the DCI format used in the UL grant.

EXAMPLE 3

UL Grant After Transmission of Scheduling Request (SR) for URLLC

In Example 3, the predetermined condition is that the UL grant is an UL grant to be received after an SR requesting scheduling of URLLC (SR for URLLC) is transmitted from terminal 100.

Here, the "UL grant to be received after an SR for URLLC is transmitted" may be an UL grant received within a predetermined period X1 [symbol] after an SR for URLLC is transmitted, or may be an UL grant received first after a URLLC SR is transmitted, for example.

Further, the SR for URLLC may be explicitly indicated to be for URLLC when an SR resource is configured by base station 200, for example. Further, an SR transmission that occurs during transmission of eMBB data and has high urgency or priority may be defined as an SR transmission for URLLC. Or, a radio resource for the SR transmission for URLLC may be defined in the specs. Or, when the cycle of the SR resource configured by base station 200 is less than or equal to a predetermined value X2 [symbol], the SR for URLLC may be defined as an SR for URLLC for which low latency is requested.

For example, when an UL grant is received after the SR for URLLC is transmitted, PC parameter controller 104 determines that this UL grant is an UL grant to schedule PUSCH for URLLC, and selects a PC parameter set of PC parameter set number j=A that corresponds to URLLC.

On the other hand, when an UL grant that does not satisfy the above predetermined condition after the SR for URLLC is transmitted is received, PC parameter controller 104 determines that this UL grant is an UL grant to schedule data of a service type other than URLLC, and selects a PC parameter set of PC parameter set number j=B that corresponds to the service type other than URLLC.

As described above, in Example 3, the PC parameter set number is implicitly indicated from base station 200 to terminal 100, in accordance with whether or not the UL grant satisfying the predetermined condition after the SR for URLLC is transmitted is received.

In addition, the values of the above-mentioned thresholds X1 and X2 may be prescribed in advance in the specs, or may be configured from base station 200 to terminal 100.

EXAMPLE 4

UL Grant Indicating Retransmission of Grant-Free Uplink Transmission

In Example 4, the predetermined condition is that the UL grant indicates retransmission in a Grant-free uplink transmission (hereinafter referred to simply as "Grant-free transmission").

The "Grant-free transmission" is a transmission method in which a radio resource (scheduling information) used in initial transmission of an uplink signal is configured in advance from base station 200 to terminal 100. In the Grant-free transmission, when transmission data to be transmitted occurs, terminal 100 transmits the transmission data using a radio resource that is secured in advance.

According to the Grant-free transmission, it is possible to reduce time from the generation of transmission data at terminal 100 to the scheduling of PUSCH by the UL grant from base station 200 after the transmission of the SR to base station 200. Therefore, it is assumed that the Grant-free transmission is used in the initial transmission for URLLC for which low latency is required.

In addition, the retransmission of the Grant-free transmission is indicated by the UL grant.

For example, when an UL grant for indicating retransmission of the Grant-free transmission is received, PC parameter controller 104 determines that this UL grant is an UL grant to schedule PUSCH for URLLC, and selects a PC parameter set of PC parameter set number j=A that corresponds to URLLC. Note that PC parameter controller 104 may determine whether or not it is the retransmission in the Grant-free transmission, based on a value of New data indicator (NDI) field in the UL grant, for example.

On the other hand, when the Grant-free transmission is not applied or when an UL grant for indicating retransmission of the Grant-free transmission is not received, PC parameter controller 104 determines that this UL grant is an UL grant to schedule data of a service type other than URLLC, and selects a PC parameter set of PC parameter set number j=B that corresponds to the service type other than URLLC.

As described above, in Example 4, the PC parameter set number is implicitly indicated from base station 200 to terminal 100, in accordance with whether or not the retransmission in the Grant-free transmission is indicated by the UL grant.

In addition, the Grant-free transmission resource for URLLC and the Grant-free transmission resource for the service type other than URLLC (e.g., eMBB) may be distinguished from each other between the configuration by base station 200 and designation in the specs.

For example, in an uplink transmission using the Grant-free transmission resource, terminal 100 may use a PC parameter set value for the Grant-free transmission that is configured in advance from base station 200 (a fixed value independent of a PC parameter set (see FIG. 1, for example) used in an UL grant based uplink transmission). Further, when the Grant-free transmission resource for URLLC is defined, the PC parameter set value may be distinguished between in the uplink transmission using the Grant-free transmission resource for URLLC and in the uplink transmission using the Grant-free transmission resource for the service type other than URLLC.

This makes it possible to perform appropriate uplink transmission power control in the initial transmission of URLLC using the Grant-free transmission resource.

Further, the UL grant for indicating retransmission of the Grant-free transmission may be scrambled using CS-RNTI, for example. In this case, when the detected UL grant is scrambled by CS-RNTI, terminal 100 may determine that the PUSCH scheduled by this UL grant is for URLLC.

EXAMPLE 5

Transmission Timing or Number of Transmission Symbols of PUSCH Indicated By UL Grant In Example 5, the predetermined condition is that a period of time from when terminal 100 receives an UL grant until when it transmits an uplink signal is within a predetermined time. Or, the predetermined condition is that the number of transmission symbols of an uplink signal indicated by an UL grant is less than or equal to a predetermined value.

The UL grant includes time resource information (e.g., Time domain resource assignment field, etc.). The time resource information includes time from the reception of the UL grant to the transmission of PUSCH (e.g., PUSCH preparation time: also referred to as $N_2$) or number of symbols (or time length) of PUSCH. When URLLC data is scheduled, the PUSCH preparation time or symbol length is likely to be configured short compared to the other service type in order to satisfy the requirements of low latency.

For example, when the PUSCH preparation time indicated by an UL grant is less than or equal to X3 [symbol], PC parameter controller 104 determines that this UL grant is an UL grant to schedule PUSCH for URLLC, and selects a PC parameter set of PC parameter set number j=A. On the other hand, when the PUSCH preparation time indicated by an UL grant is greater than X3 [symbol], PC parameter controller 104 determines that this UL grant is an UL grant to schedule data of a service type other than URLLC, and selects a PC parameter set of PC parameter set number j=B.

Or, when the number of symbols of PUSCH indicated by an UL grant is less than or equal to X4 [symbol], PC parameter controller 104 determines that this UL grant is an UL grant to schedule PUSCH for URLLC, and selects a PC parameter set of PC parameter set number j=A. On the other hand, when the number of symbols of PUSCH indicated by an UL grant is greater than X4 [symbol], PC parameter controller 104 determines that this UL grant is an UL grant to schedule data of a service type other than URLLC, and selects a PC parameter set of PC parameter set number j=B.

As described above, in Example 5, the PC parameter set number is implicitly indicated from base station 200 to terminal 100, in accordance with the transmission timing (or the number of transmission symbols) of PUSCH indicated by the UL grant.

EXAMPLE 6

UL Grant Detection Cycle

In Example 6, the predetermined condition is that an UL grant detection cycle in terminal 100 is less than or equal to a predetermined value.

In each DCI format including an UL grant, a predetermined detection cycle for each terminal 100 is configured from base station 200. When URLLC data is scheduled, it is likely that a shorter detection cycle is configured for the UL grant in order to satisfy the requirements of low latency.

For example, when the UL grant detection cycle is less than or equal to X5 [symbol], PC parameter controller 104 determines that this UL grant is an UL grant to schedule PUSCH for URLLC, and selects a PC parameter set of PC parameter set number j=A.

On the other hand, when the UL grant detection cycle is greater than X5 [symbol], PC parameter controller 104 determines that this UL grant is an UL grant to schedule data of a service type other than URLLC, and selects a PC parameter set of PC parameter set number j=B.

As described above, in Example 6, the PC parameter set number is implicitly indicated from base station 200 to terminal 100, in accordance with the UL grant detection cycle.

EXAMPLE 7

Modulation and Coding Scheme (MCS) Table Used in UL Grant

In Example 7, the predetermined condition is that an MCS table used in an UL grant is different from a predetermined MCS table.

In the NR, "MCS table for URLLC" and "MCS table for eMBB" are defined in an MCS table (an MCS pattern table uniquely corresponding to the MCS number) used in an UL grant for indicating an MCS (coding rate and modulation scheme) to a terminal.

An example of the MCS table for URLLC is shown in FIG. 7A, and an example of the MCS table for eMBB is shown in FIGS. 7B and 7C (see NPL 6, for example). The MCS table for URLLC shown in FIG. 7A does not have 256QAM (Modulation Order Qm=8) included in the MCS table for eMBB shown in FIG. 7C, and includes an MCS whose coding rate is lower than that of the MCS table for eMBB shown in FIGS. 7B and 7C (in other words, an MCS with lower Spectral efficiency).

For example, which MCS table to be used by terminal 100 is determined in advance by a terminal-specific scrambling sequence (e.g., RNTI) used in a DCI format or by a search space that is a PDCCH allocation resource.

For example, when an MCS table used in an UL grant is the MCS table for URLLC, PC parameter controller 104 determines that this UL grant is an UL grant to schedule URLLC data. In other words, when an MCS table used in an UL grant is the MCS table for URLLC, PC parameter controller 104 determines that the PUSCH scheduled by this UL grant is a PUSCH for URLLC (URLLC PUSCH).

For example, when the MCS table used in an UL grant detected by terminal 100 is the MCS table for URLLC, PC parameter controller 104 determines that this UL grant is an UL grant to schedule PUSCH for URLLC, and selects a PC parameter set of PC parameter set number j=A that corresponds to URLLC.

On the other hand, when the MCS table used in an UL grant detected by terminal 100 is the MCS table for eMBB (or an MCS table other than the MCS table for URLLC), PC parameter controller 104 determines that this UL grant is an UL grant to schedule data of a service type other than URLLC. When determined that the UL grant is an UL grant to schedule data of a service type other than URLLC, PC parameter controller 104 selects a PC parameter set of PC parameter set number j=B that corresponds to the service type other than URLLC.

As described above, in Example 7, the PC parameter set number is implicitly indicated from base station 200 to terminal 100, in accordance with the MCS table of the DCI format used in the UL grant.

The examples of the "predetermined condition" for determining that the UL grant is one that schedules URLLC data have been described above.

Note that a plurality of predetermined conditions described in Examples 1 to 7 may be combined.

[Configuration Example of PC Parameter Set Number j=A, B]

Next, a setting example of PC parameter set numbers j=A and B configured in PC parameter controller 104 will be described.

For example, the transmission power of URLLC PUSCH is at least configured to be larger than the transmission power of PUSCH of a service type other than URLLC (e.g., eMBB).

For example, in Equation 1, the PUSCH transmission power $P_{PUSCH,f,c}(i, j, qd, l)$ is likely to increase as the target reception power $P_{O\_PUSCH,f,c}(j)$ of the PC parameter set increases. Further, the PUSCH transmission power $P_{PUSCH,f,c}(i, j, qd, l)$ is likely to increase as the weighting factor $\alpha_{f,c}(j)$ representing the path loss compensation ratio of the PC parameter set increases, because the value of the path loss will be more easily reflected in the PUSCH transmission power $P_{PUSCH,f,c}(i, j, qd, l)$.

Therefore, as shown in FIG. 6, for example, the smallest number 0 of PC parameter set number j (any one of j=0 to J-1) may be configured to a PC parameter set value (B=0) of the service type other than URLLC (e.g., for eMBB), for example, and the largest number J-1 of PC parameter set number j may be configured to a PC parameter set value (A=J-1) for URLLC. As shown in FIG. 6, $P_{O\_PUSCH,f,c}(0)=-80$ dBm and $\alpha_{f,c}(0)=0.6$ in the case of PC parameter set number j=0, and $P_{O\_PUSCH,f,c}(J-1)=-50$ dBm and $\alpha_{f,c}(J-1)=1.0$ in the case of PC parameter set number j=J-1. Therefore, the PUSCH transmission power $P_{PUSCH,f,c}(i, j, qd, l)$ when PC parameter set number j=J-1 is configured is likely to be larger than the PUSCH transmission power $P_{PUSCH,f,c}(i, j, qd, l)$ when PC parameter set number j=0 is configured.

Note that the case in which PC parameter set number A is set to be the maximum value J-1 of j and PC parameter set number B is set to be the minimum value 0 of j has been described in FIG. 6, but PC parameter set numbers A and B are not limited to these values. For example, PC parameter set number B may be configured to have a greater value than PC parameter set number A.

Or, PC parameter set number A for URLLC may be set to be the PC parameter set number (=B+Δ) obtained by adding a predetermined offset Δ to PC parameter set number B of the service type other than URLLC (e.g., eMBB).

Or, a PC parameter set value $(P_{O\_PUSCH,f,c}(B)+\Delta)$ obtained by adding a predetermined offset Δ [dB] to PC parameter set value of the service type other than URLLC (e.g., eMBB) may be used as a PC parameter set value $(P_{O\_PUSCH,f,c}(A))$ for URLLC. That is, it may be $P_{O\_PUSCH,f,c}(A)=P_{O\_PUSCH,f,c}(B)+\Delta$.

In addition, in a case where terminal 100 performs transmission and reception with a plurality of Transmission/Reception Points (TRP), PC parameter set number A for URLLC and PC parameter set number B of the service type other than URLLC may be defined for each TRP. FIG. 8 shows a configuration example of PC parameter set values for each TRP. In FIG. 8, for TRP #0, PC parameter set number j=J-2 is configured as the PC parameter set value for URLLC, and PC parameter set number j=0 is configured as the PC parameter set value of the service type other than URLLC, for example. Similarly, for TRP #1, PC parameter set number j=J-1 is configured as the PC parameter set value for URLLC, and PC parameter set number j=1 is configured as the PC parameter set value of the service type other than URLLC.

Different TRPs have very different propagation environment such as the path loss, etc. Therefore, as shown in FIG. 8, the PC parameter sets suitable for the respective TRPs may be defined and selectable. As a result, terminal 100 can configure the PUSCH transmission power for each TRP appropriately.

Note that the configuration of PC parameter set for each TRP shown in FIG. 8 is merely an example, and is not limited hereto, and the transmission power of URLLC PUSCH may be at least configured to be higher than the transmission power of PUSCH of the service type other than URLLC for each TRP. For example, depending on the propagation environment of TRP #0 and TRP #1, the PC parameter set value for URLLC with respect to TRP #0 may be configured to be lower than the PC parameter set value of the service type other than URLLC.

Further, in a case where base station 200 having a plurality of antenna panels with different arrangement environments (in other words, different Quaisi-colocation (QCL)) communicates with terminal 100, PC parameter set number A for URLLC and PC parameter set number B of the service type other than URLLC may be defined for each antenna panel, in the same manner as in the case where a plurality of TRPs communicate with terminal 100 (see FIG. 8, for example).

In addition, the TRP number and the antenna panel number can be determined from a control channel transmission resource (e.g., referred to as Control Resource Set (CORESET)) in which a control channel (e.g., PDCCH) received by terminal 100 is configured, for example.

The configuration of PC parameter set numbers j=A and B has been described above.

In addition, the correspondence relationship between PC parameter set number j and the PC parameter set (e.g., $P_{O\_PUSCH,f,c}(j)$ and $\alpha_{f,c}(j)$) is not limited to an example shown in FIG. 6. For example, FIG. 6 shows a case where $P_{O\_PUSCH,f,c}(j)$ and $\alpha_{f,c}(j)$ increase as a value of PC parameter set number j increases (in other words, a case where $P_{O\_PUSCH,f,c}(j)$ and $\alpha_{f,c}(j)$ are in ascending order). However, a value of $P_{O\_PUSCH,f,c}(j)$ or $\alpha_{f,c}(j)$ does not need to increase as a value of PC parameter set number j increases.

As described above, in the present embodiment, terminal 100 configures the PC parameter set (power control parameter) corresponding to URLLC when the predetermined condition relating to an UL grant is satisfied, and configures the PC parameter set corresponding to the service type other than URLLC when the predetermined condition is not satisfied. Then, terminal 100 transmits an uplink signal using the transmission power calculated using the configured PC parameter set.

As a result, it is possible to implicitly indicate the parameter (e.g., PC parameter set) of transmission power control (e.g., power boosting) of PUSCH for URLLC from base station 200 to terminal 100. Therefore, even in an UL grant that does not include information (or field) explicitly indicating the PC parameter set number, it is possible to appropriately configure the uplink channel transmission power suitable for the service type such as URLLC and eMBB, etc. Further, since there is no need to add new information to an UL grant, it is possible to prevent an increase in PDCCH overhead.

Therefore, according to the present embodiment, terminal 100 can appropriately transmit an uplink signal using an uplink channel transmission power in accordance with the service type.

Figure 9:
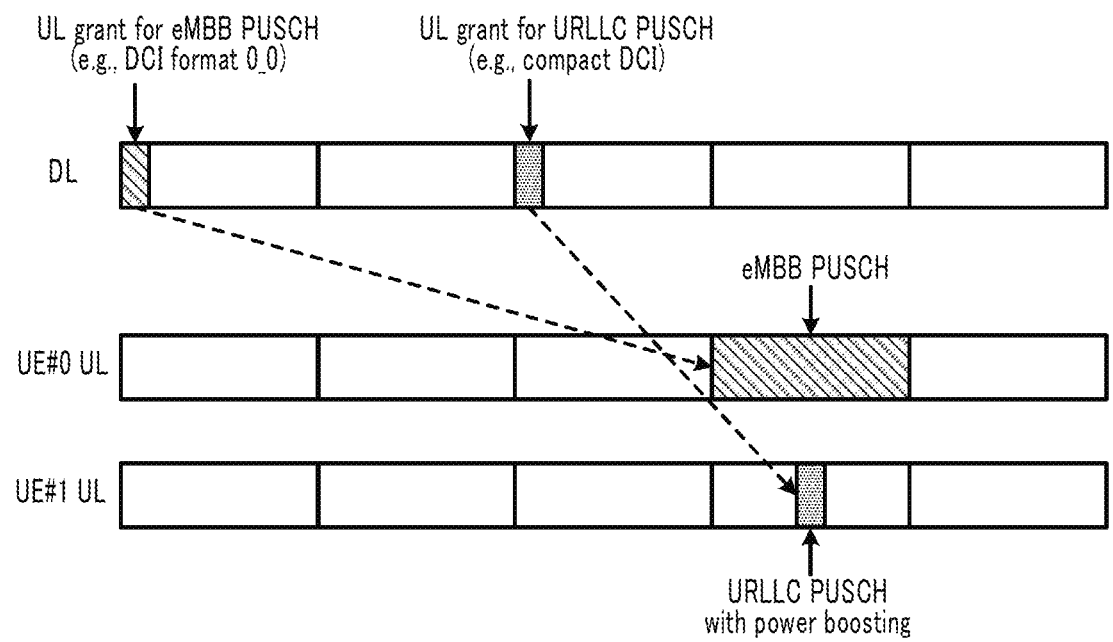
FIG. 9 is a diagram showing an example in which a radio resource overlaps between URLLC and eMBB according to Embodiment 1.

Here, low latency is required for the URLLC uplink transmission. Therefore, as shown in FIG. 9, URLLC data (URLLC PUSCH) may be scheduled over the radio resource that has been already allocated to another terminal for eMBB data (eMBB PUSCH). Further, in URLLC it has been studied to allocate a broadband radio resource to obtain a frequency diversity gain. Therefore, it is assumed that a portion of radio resource (e.g., time resource or frequency resource) overlaps between URLLC and eMBB.

As described above, according to the present embodiment, terminal 100 can appropriately configure, in an uplink transmission of URLLC data, the uplink transmission power by which URLLC data can be decoded in base station 200, even when some or all of radio resource for the uplink transmission collide (overlap) between eMBB data and URLLC data from different terminals (e.g., UE #0 and UE #1 in FIG. 9). Therefore, it is possible to satisfy the requirements of low latency and high reliability for URLLC.

Embodiment 2

In the present embodiment, a PUSCH transmission power configuration method when uplink control information for URLLC (hereinafter, referred to as Uplink Control Information (UCI)) is transmitted on PUSCH (also referred to as "to Piggyback UCI")) will be described.

For example, when the transmission timing of PUCCH that is an uplink channel for UCI transmission overlaps with PUSCH transmission timing, the terminal multiplexes UCI with Uplink Shared Channel (UL-SCH: uplink data information) and transmit it on PUSCH (also referred to as "to Piggyback UCI") in order to prevent an increase in Peak to Average Power Ratio (PAPR) by multi-carrier transmission.

Here, when the terminal transmits on PUSCH a UCI required to have the same high quality as URLLC data (hereinafter referred to as "UCI for URLLC"), power boosting may be required to satisfy UCI quality. In other words, when UCI for URLLC is transmitted on PUSCH at the terminal, power boosting may be required compared to when the service type other than URLLC (e.g., eMBB) is transmitted. In addition, as UCI for URLLC, ACK/NACK information for URLLC data or Channel State Information (hereinafter referred to as CSI) for a target Block Error Rate (BLER) for URLLC (e.g., BLER=10E-5), etc. are assumed, for example (the details will be described later).

However, PUSCH transmission power control is determined either with or without UCI. Therefore, when the SRI field is not included as is the case with the fallback DCI (e.g., DCI format 0_0), that is, when the UL grant that does not include information explicitly indicating the PC parameter set number is used, the PUSCH transmission power is determined regardless of the presence or absence of UCI for URLLC. For this reason, the terminal may not be able to appropriately power-boost the transmission power of PUSCH including UCI. For example, even when the terminal transmits data for eMBB and UCI for PUSCH on one PUSCH, the same transmission power as when data for eMBB is transmitted alone (in other words, when data for eMBB is transmitted without UCI) is applied. Therefore, UCI for PUSCH may have insufficient transmission power and may not satisfy URLLC quality requirements.

Therefore, in the present embodiment, a method of appropriately power-boosting the transmission power of PUSCH including UCI (in particular, UCI for URLLC) by selecting the PC parameter set will be described.

A communication system according to the present embodiment includes terminal 300 (see FIG. 10 which will be described later) and base station 200 (see FIG. 4, for example).

[Configuration of Terminal 300]

Figure 10:
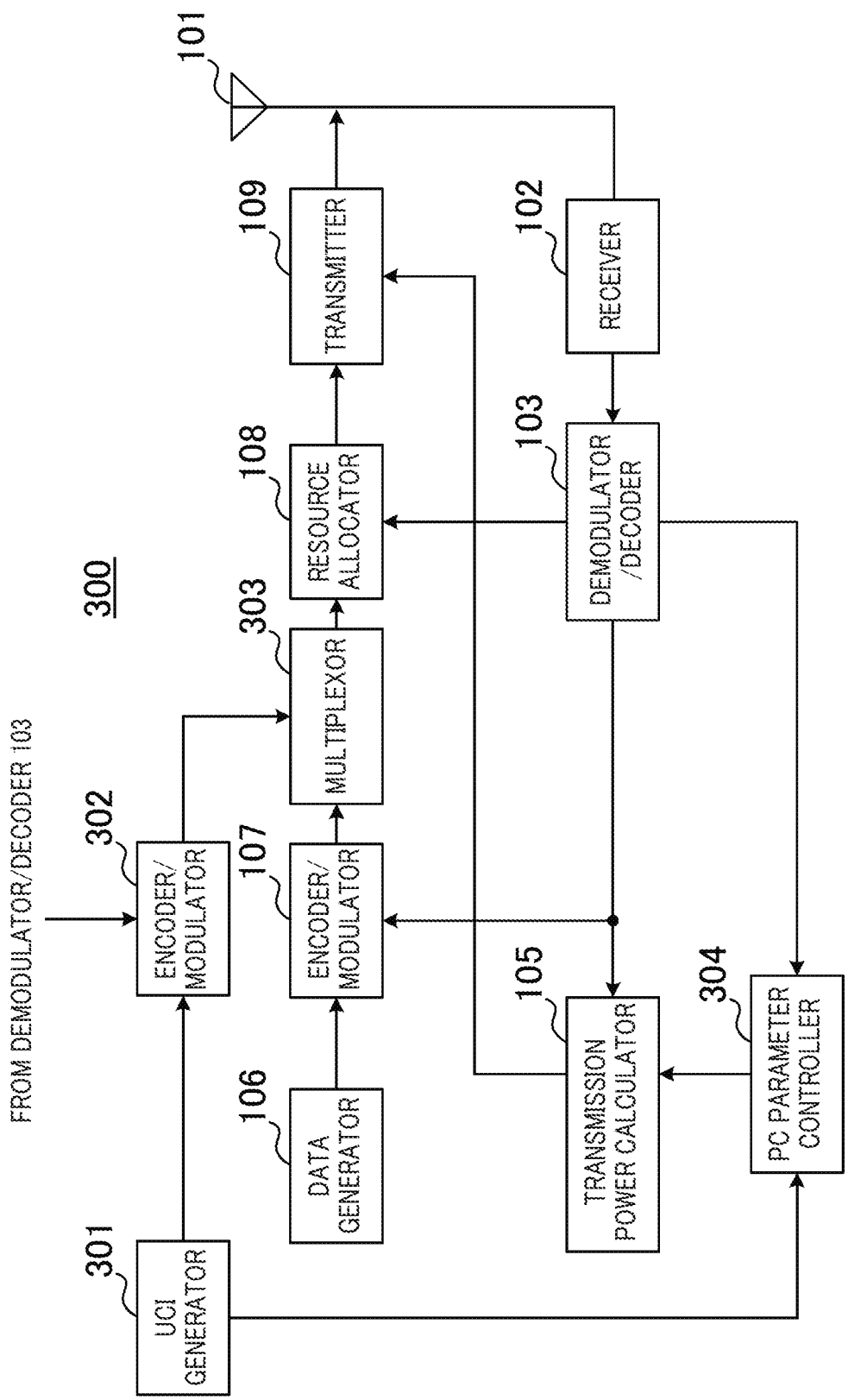
FIG. 10 is a diagram showing a configuration example of a terminal according to Embodiment 2.

FIG. 10 is a block diagram showing a configuration example of terminal 300 according to the present embodiment. In FIG. 10, the same components as those of terminal 100 (FIG. 3) of Embodiment 1 are denoted by the same reference numerals, and descriptions thereof are omitted. Specifically, in terminal 300 shown in FIG. 10, UCI generator 301, encoder/modulator 302, and multiplexor 303 are added to terminal 100 shown in FIG. 3, and the operation of PC parameter controller 304 is different.

UCI generator 301 generates UCI (uplink control information such as ACK/NACK or CSI, etc.) to be transmitted by terminal 300, and outputs the generated UCI to encoder/modulator 302. Further, UCI generator 301 outputs information relating to the UCI to be transmitted, to PC parameter controller 304.

Encoder/modulator 302 performs coding and modulation on the UCI inputted from UCI generator 301 based on the DCI input from demodulator/decoder 103, and outputs the modulated UCI signal to multiplexor 303.

Multiplexor 303 multiplexes the UCI signal inputted from encoder/modulator 302 and the modulated data signal inputted from encoder/modulator 107, and outputs the multiplexed data signal to resource allocator 108. Multiplexor 303 may puncture some Resource Elements (REs) of the data signal and put the UCI signal into the punctured portion, as a method of multiplexing the UCI and the data signal, for example. Or, multiplexor 303 may consider the RE size of the UCI signal in advance and determine (rate-match) the RE size of the data signal.

PC parameter controller 304 determines PC parameter set number j to be applied to PUSCH that have been scheduled, using the DCI inputted from demodulator/decoder 103 and information relating to the UCI inputted from UCI generator 301. PC parameter controller 304 outputs the determined PC parameter set number to transmission power calculator 105.

[Configuration of Base Station]

Since the base station according to the present embodiment has the same basic configuration as base station 200 according to Embodiment 1, it will be described using FIG. 4. Note that the decoded reception data in base station 200 according to the present embodiment includes UCI in addition to data from terminal 300 (see FIG. 10).

Hereinafter, examples of the "predetermined condition" for adapting the power boosting of the transmission power by changing the PC parameter set with respect to the PUSCH including (multiplexing or Piggybacking) the UCI (in particular, UCI for URLLC) will be described.

EXAMPLE 1

Including ACK/NACK to PDSCH (Downlink Data Channel) for URLLC

In Example 1, the predetermined condition is that UCI included in a PUSCH to be scheduled by an UL grant is an ACK/NACK (response signal) to a PDSCH for URLLC. It can be considered that the ACK/NACK to the PDSCH for URLLC is required to have low latency and high reliability, similarly to the PDSCH for URLLC.

In addition, when a scrambling sequence (e.g., RNTI) used in the DCI to schedule PDSCH is different from a predetermined sequence (e.g., C-RNTI or CS-RNTI to schedule PDSCH for eMBB), terminal 300 can determine that this PDSCH is a PDSCH for URLLC. For example, when a scrambling sequence used in the DCI to schedule PDSCH is an RNTI for URLLC, terminal 300 may determine that this PDSCH is a PDSCH for URLLC.

Or, when an MCS table for URLLC is used in the DCI to schedule PDSCH, terminal 300 can determine that this PDSCH is a PDSCH for URLLC.

For example, when an ACK/NACK to an PDSCH for URLLC is included in a PUSCH to be scheduled by an UL grant detected by terminal 300, PC parameter controller 304 determines that this UL grant is an UL grant to schedule a PUSCH that includes UCI for URLLC, and selects a PC parameter set of PC parameter set number j=A that corresponds to URLLC.

On the other hand, when an ACK/NACK to an PDSCH for URLLC is not included in a PUSCH to be scheduled by an UL grant detected by terminal 300, PC parameter controller 304 determines that this UL grant is an UL grant to schedule a PUSCH that does not include UCI for URLLC, and selects a PC parameter set of PC parameter set number j=B that corresponds to a service type other than URLLC.

As described above, in Example 1, the PC parameter set number is implicitly indicated from base station 200 to terminal 300, in accordance with whether or not the ACK/NACK to the PDSCH for URLLC is included in the PUSCH to be scheduled by the UL grant.

EXAMPLE 2

ACK/NACK when Time Interval from PDSCH Reception Until ACK/NACK Transmission is Not Greater than Predetermined Threshold In Example 2, the predetermined condition is that a UCI included in a PUSCH to be scheduled by an UL grant is a ACK/NACK when a time interval from PDSCH reception to ACK/NACK transmission (sometimes referred to as N1 [symbol], for example) is less than or equal to a predetermined threshold value X6 [symbol]. For example, N1 is included in the DCI to schedule PDSCH.

In other words, the predetermined condition is that a period of time N1 [symbol] from when terminal 300 receives PDSCH until when terminal 300 transmits a UCI including ACK/NACK to this PDSCH is within a predetermined time X6.

When N1 is short (in other words, in a case of N1≤X6), terminal 300 can determine that the UCI included in the PUSCH scheduled by the UL grant is UCI for URLLC for which low latency is required.

For example, when an ACK/NACK with N1 short (ACK/NACK where N1≤X6) is included in a PUSCH to be scheduled by an UL grant detected by terminal 300, PC parameter controller 304 determines that this UL grant is an UL grant to schedule a PUSCH that includes UCI for URLLC, and selects a PC parameter set of PC parameter set number j=A that corresponds to URLLC.

On the other hand, in a case other than the above (e.g., when an ACK/NACK with N1 long (ACK/NACK where N1>X6) is included in the PUSCH), PC parameter controller 304 determines that this UL grant is an UL grant to schedule a PUSCH that does not include UCI for URLLC, and selects a PC parameter set of PC parameter set number j=B that corresponds to a service type other than URLLC.

As described above, in Example 2, the PC parameter set number is implicitly indicated from base station 200 to terminal 300, in accordance with whether or not the ACK/NACK with N1 short is included in the PUSCH to be scheduled by the UL grant.

EXAMPLE 3

CSI Calculated with Target BLER not Greater than Predetermined Threshold

In Example 3, the predetermined condition is that a UCI included in a PUSCH to be scheduled by an UL grant is a CSI calculated with a target error rate (e.g., target BLER) less than or equal to a predetermined threshold value X7.

The target BLER used in CSI calculation is configured in advance from base station 300 to terminal 200. Terminal 300 can determine that the CSI calculated with a low target BLER less than or equal to the threshold value X7 is UCI for URLLC.

For example, when CSI calculated with a target BLER (e.g., target BLER=10E-5) less than or equal to the predetermined threshold value X7 is included in a PUSCH to be scheduled by an UL grant detected by terminal 300, PC parameter controller 304 determines that this UL grant is an UL grant to schedule a PUSCH that includes UCI for URLLC, and selects a PC parameter set of PC parameter set number j=A that corresponds to URLLC.

On the other hand, in a case other than the above (e.g., when CSI calculated with a target BLER (e.g., target BLER=10E-1) greater than the predetermined threshold value X7 is included in the PUSCH), PC parameter controller 304 determines that this UL grant is an UL grant to schedule a PUSCH that does not include UCI for URLLC, and selects a PC parameter set of PC parameter set number j=B that corresponds to a service type other than URLLC.

As described above, in Example 3, the PC parameter set number is implicitly indicated from base station 200 to terminal 300, in accordance with whether or not the CSI calculated with the target BLER less than or equal to the predetermined threshold value X7 is included in the PUSCH to be scheduled by the UL grant.

EXAMPLE 4

Including ACK/NACK to PDSCH for eMBB

In Example 4, the predetermined condition is that UCI included in a PUSCH to be scheduled by an UL grant is an ACK/NACK to a PDSCH for eMBB. That is, the condition is opposite to the condition (being an ACK/NACK to a PDSCH for URLLC) of Example 1 according to the present embodiment.

For example, when scheduling a service having a lower priority of low latency and a higher priority of high reliability, base station 200 can be considered to perform such a control that the total error rate obtained by multiplying respective error rates of PDSCH and ACK/NACK to this PDSCH becomes a predetermined quality.

For example, a case where the total error rate (a value obtained by multiplying respective error rates) of PDSCH and ACK/NACK becomes a constant value (e.g., 10E-6) will be described. In this case, base station 200 performs such a control that the error rate of PDSCH becomes 10E-1 (quality equivalent to PDSCH for eMBB) and the error rate of ACK/NACK becomes 10E-5 (quality equivalent to UCI for URLLC), for example. Or, base station 200 performs such a control that the error rate of PDSCH becomes 10E-5 (quality equivalent to PDSCH for URLLC) and the error rate of ACK/NACK becomes 10E-1 (quality equivalent to UCI for eMBB).

In other words, ACK/NACK to PDSCH whose error rate is controlled to be 10E-1 (PDSCH for eMBB) is UCI for URLLC whose error rate is controlled to be 10E-5. On the other hand, ACK/NACK to PDSCH whose error rate is controlled to be 10E-5 (PDSCH for URLLC) is UCI for eMBB whose error rate is controlled to be 10E-1.

Therefore, when base station 200 performs such a control as described above, for example, when an ACK/NACK to a PDSCH for eMBB is included in a PUSCH to be scheduled by an UL grant detected by terminal 300, PC parameter controller 304 determines that this UL grant is an UL grant to schedule a PUSCH that includes UCI for URLLC (ACK/NACK), and selects a PC parameter set of PC parameter set number j=A that corresponds to URLLC.

On the other hand, in a case other than the above, PC parameter controller 304 determines that this UL grant is an UL grant to schedule a PUSCH that does not include UCI for URLLC (e.g., PUSCH including UCI for eMBB), and selects a PC parameter set of PC parameter set number j=B that corresponds to a service type other than URLLC.

As described above, in Example 4, the PC parameter set number is implicitly indicated from base station 200 to terminal 300, in accordance with whether or not the ACK/NACK to the PDSCH for eMBB is included in the PUSCH to be scheduled by the UL grant.

Note that although the method of controlling the PC parameter set value is reversed between Examples 1 and 4 according to the present embodiment, an appropriate control method may be selected in accordance with the scheduling method assumed by base station 200.

EXAMPLE 5

Number of REs Required for UCI for URLLC Reaches Upper Limit

In Example 5, the predetermined condition is that UCI for URLLC applicable to any one of Examples 1 to 4 according to the present embodiment is included (Piggybacked) in a PUSCH to be scheduled by an UL grant and the number of REs required for this UCI for URLLC reaches the upper limit of the number of REs that can be arranged in the PUSCH.

In the NR, in a case of ACK/NACK, the number of REs of UCI that can be arranged in a PUSCH is determined in accordance with the following Equation 2, for example.

[2]

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{SC}^{UCI}(l) \right\rceil \right\}$$

(Equation 2)

Here, $Q'_{ACK}$ represents the number of REs (referred to as Actual RE number) of an ACK/NACK to be actually transmitted on PUSCH, $O_{ACK}$ represents the number of ACK/NACK bits, $L_{ACK}$ represents the number of Cyclic Redundancy Check (CRC) bits, $\beta_{offset}^{PUSCH}$ represents a correction factor (parameter) of a coding rate of ACK/NACK to data (UL-SCH), $\Sigma M_{SC}^{UCI}(l)$ (where l=0 to $N_{symb,all}^{PUSCH}-1$) represents the number of REs to be used in transmission of PUSCH, and $\Sigma K_r$ (where r=0 to $C_{UL-SCH}-1$) represents the number of bits of data (UL-SCH) to be transmitted on PUSCH. Further, α represents a ratio of the number of REs of UCI (ACK/NACK) to be transmitted on PUSCH. In other words, a is a parameter for determining the upper limit of the number of REs of UCI to ensure the quality of UL-SCH.

Here, the left-hand side of the min-function of Equation 2 (let $Q''_{ACK}$ as in the following Equation 3) represents the number of REs (referred to as the Required RE number) used in transmission of PUSCH to obtain the quality required for ACK/NACK.

[3]

$$Q''_{ACK} = \left\lceil \frac{(O_{ACK} + L_{ACK}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil$$

(Equation 3)

When the number of REs (Required RE number) required for UCI for URLLC reaches the upper limit, that is, when the number of REs is limited by a to be $Q'_{ACK}<Q''_{ACK}$, terminal 300 cannot arrange UCI having the number of REs to satisfy the required quality in PUSCH.

Therefore, when the number of REs required for UCI for URLLC reaches the upper limit of the number of REs that can be arranged in the PUSCH (i.e., in the case of $Q'_{ACK} < Q''_{ACK}$), PC parameter controller 304 selects a PC parameter set of PC parameter set number j=A that corresponds to URLLC in order to improve the quality of UCI for URLLC.

On the other hand, when the number of REs required for UCI for URLLC has not reached the upper limit of the number of REs that can be arranged in the PUSCH (i.e., in the case of $Q'_{ACK} \geq Q''_{ACK}$), PC parameter controller 304 determines that there is no need to perform power boosting and selects a PC parameter set of PC parameter set number j=B that corresponds to a service type other than URLLC.

As described above, in Example 5, the PC parameter set number is implicitly indicated from base station 200 to terminal 300, in accordance with whether or not the number of REs required for UCI for URLLC included in the PUSCH to be scheduled by the UL grant reaches the upper limit of the number of REs that can be arranged in the PUSCH.

In addition, terminal 300 performs the same processing as described above even when the UCI for URLLC is CSI (more specifically, CSI-1(CSI part1) and CSI-2(CSI part2). That is, when the number of REs of the CSI to be arranged in the PUSCH is limited by a, terminal 300 selects a PC parameter set of PC parameter set number j=A that corresponds to URLLC in order to improve the quality of UCI for URLLC.

EXAMPLE 6

Number of REs of UCI Including UCI for URLLC is Greater than a Predetermined Ratio In Example 6, the predetermined condition is that UCI for URLLC applicable to any one of Examples 1 to 4 according to the present embodiment is included in a PUSCH to be scheduled by an UL grant and the number of REs of UCI including UCI for URLLC is greater than a predetermined ratio in the overall PUSCH.

For example, terminal 300 performs power boosting on a PUSCH when the condition shown in the following Equation 4 is satisfied.

[4]

$$Q'_{ACK} + Q'_{CSI-1} + Q'_{CSI-2} > \gamma \cdot \sum_{l=0}^{N^{PUSCH}_{symb,all}-1} M^{UCI}_{SC}(l) \quad \text{(Equation 4)}$$

Here, Q'ACK, Q'CSI-1, and Q'CSI-2 represent the number of REs (Actual RE number) of ACK/NACK, CSI part1, and CSI part2 that are actually transmitted on PUSCH, respectively. Further, $\Sigma M_{SC}^{UCI}(l)$ (where l=0 to $N_{symb,all}^{PUSCH}-1$) represents the number of REs to be used in transmission of PUSCH, and γ represents a ratio of the upper limit of the number of REs of UCI (total UCI including ACK/NACK and CSI) including UCI for URLLC to be transmitted on PUSCH. For example, when the ratio of the number of REs of the UCI to the number of REs of the entire PUSCH exceeds this ratio γ, it is assumed that the UCI is more dominant than the UL-SCH in the PUSCH.

For example, when the total Required RE number of the UCI including UCI for URLLC reaches the upper limit, that is, when the condition of Equation 4 is satisfied, PC parameter controller 304 determines that the UCI is dominant compared to the UL-SCH in the PUSCH, and selects a PC parameter set of PC parameter set number j=A that corresponds to URLLC.

On the other hand, when the total Required RE number of the UCI including UCI for URLLC does not reach the upper limit, that is, when the condition of Equation 4 is not satisfied, PC parameter controller 304 determines that the UL-SCH is dominant compared to the UCI in the PUSCH, and selects a PC parameter set of PC parameter set number j=B that corresponds to a service type other than URLLC.

As described above, in Example 6, the PC parameter set number is implicitly indicated from base station 200 to terminal 300, in accordance with whether or not the UCI is dominant compared to the UL-SCH in the PUSCH.

Note that δ representing the upper limit (number of REs) of the number of REs of UCI to be transmitted on PUSCH may be defined as in the following Equation 5. That is, when the condition of Equation 5 is satisfied, terminal 300 determines that the UCI is dominant compared to the UL-SCH in the PUSCH, and selects a PC parameter set of PC parameter set number j=A that corresponds to URLLC. As a result, effects similar to those of the control using the ratio γ shown in Equation 4 can be obtained.

[5]

$$Q'_{ACK} + Q'_{CSI-1} + Q'_{CSI-2} > \delta \quad \text{(Equation 5)}$$

The examples of the "predetermined condition" for adapting the power boosting of the transmission power by changing the PC parameter set with respect to the PUSCH including the UCI have been described above.

Note that a plurality of predetermined conditions described in Examples 1 to 6 may be combined.

[Method of Selecting PC Parameter Set]

Next, a method of selecting a PC parameter set when UCI is included in PUSCH, in PC parameter controller 304 of terminal 300, will be described.

EXAMPLE 1

Selection of PC Parameter Set for Each UCI Type of UCI for URLLC

In Example 1, PC parameter controller 304 selects a PC parameter set for each UCI type of UCI for URLLC (e.g., ACK/NACK, CSI part1, or CSI part2, etc.).

For example, as shown in FIG. 11, when the UCI type is CSI (CSI part1 or CSI part2), PC parameter controller 304 selects a PC parameter set of PC parameter set number j=J-2 that corresponds to URLLC. Further, when the UCI type is ACK/NACK, PC parameter controller 304 selects a PC parameter set of PC parameter set number j=J-1 that corresponds to URLLC.

As a result, it is possible to increase a transmission power of the ACK/NACK which is considered to have a large impact on delay time of packet transmission compared to the CSI.

In addition, CSI part1 includes Wideband CQI or Rank Indicator, and CSI part2 includes Subband CQI. CSI part1 is considered to be important information that is frequently used in scheduling of a base station, compared to CSI part2. Therefore, PC parameter controller 304 may define a PC parameter set such that a high transmission power is configured when CSI part1 is included as UCI for URLLC, compared to when only CSI part2 is included as UCI.

For example, when CSI part1 is included in the UCI, PC parameter controller 304 selects a PC parameter set of PC parameter set number j=J-2 (e.g., $P_{O\_PUSCH,f,c}(j)$=−60 dBm, $\alpha_{f,c}(j)$=0.9). Further, when only CSI part2 is included in the UCI, PC parameter controller 304 selects a PC parameter set defined by PC parameter set number j=J-3 (e.g., $P_{O\_PUSCH,f,c}(j)$=−55 dBm, $\alpha_{f,c}(j)$=0.9)

As a result, it is possible to configure an appropriate transmission power in accordance with the degree of importance of CSI information.

EXAMPLE 2

Selection of PC Parameter Set in Accordance with the Number of UCI Bits Including UCI for URLLC In Example 2, PC parameter controller 304 selects a PC parameter set in accordance with the number of UCI bits including UCI for URLLC.

For example, as shown in FIG. 12, when the number of UCI bits including UCI for URLLC is less than or equal to a predetermined threshold value X8 [bit], PC parameter controller 304 selects a PC parameter set of PC parameter set number j=J-2 that corresponds to URLLC. Further, when the number of UCI bits including UCI for URLLC is greater than the predetermined threshold value X8 [bit], PC parameter controller 304 selects a PC parameter set of PC parameter set number j=J-1 that corresponds to URLLC.

As a result, it is possible to increase the PUSCH transmission power as the number of UCI bits increases, that is, as the UCI becomes more dominant in the entire PUSCH.

EXAMPLE 3

Selection of PC Parameter Set in Accordance with a Combination of Service Types of UL-SCH and UCI for URLLC In Example 3, PC parameter controller 304 selects a PC parameter set in accordance with a combinations of service types of UL-SCH and UCI for URLLC.

As shown in FIG. 13, there are four combinations of UL-SCH (PUSCH) and UCI for URLLC. In FIG. 13, (1) shows a combination in which UCI for eMBB is transmitted on PUSCH for eMBB, (2) shows a combination in which UCI for URLLC is transmitted on PUSCH for URLLC, (3) shows a combination in which UCI for URLLC is transmitted on PUSCH for eMBB, and (4) shows a combination in which UCI for eMBB is transmitted on PUSCH for URLLC.

For example, as in Option 1 shown in FIG. 13, PC parameter controller 304 may select a PC parameter set of PC parameter set number j=A that corresponds to URLLC, in a case of the combination in which at least one of UCI for URLLC and PUSCH for URLLC is included (combination of (2), (3), or (4) of FIG. 13). On the other hand, as in Option 1 shown in FIG. 13, PC parameter controller 304 may select a PC parameter set of PC parameter set number j=B that corresponds to URLLC, in a case of the combination in which none of UCI for URLLC nor PUSCH for URLLC is included (combination of (1) of FIG. 13).

Or, as in Option 2 of FIG. 13, PC parameter controller 304 may select a PC parameter set in accordance with the respective combinations. In Option 2 of FIG. 13, PC parameter controller 304 selects a PC parameter set of PC parameter set number j=B that corresponds to eMBB, in a case of the combination of (1), and selects PC parameter sets of PC parameter set numbers j=A1 to A3 that corresponds to URLLC, in a case of the combination of (2) to (4), respectively.

For example, as shown in Option 2 of FIG. 13, when the quality of UCI for URLLC is prioritized over the quality of PUSCH for URLLC, PC parameter controller 304 configures a PC parameter set in which the transmission power increases in the order of (2)>(3)>(4). Note that the PC parameter set configuration method is not limited to the example shown in FIG. 13. For example, when the quality of PUSCH for URLLC is prioritized over the quality of UCI for URLLC, PC parameter controller 304 may configure a PC parameter set in which the transmission power increases in the order of (2)>(4)>(3).

As a result, terminal 300 can configure the transmission power in accordance with the combination of service types of UL-SCH (PUSCH) and UCI for URLLC.

The method of selecting the PC parameter set has been described above. Note that the PC parameter set values (e.g., j=0, J-3, J-2, or J-1) configured in FIGS. 11 to 13 are one example, and other values may be used.

As described above, in the present embodiment, terminal 300 configures the PC parameter set (power control parameter) corresponding to URLLC when the predetermined condition relating to UCI for URLLC included in PUSCH to be scheduled by an UL grant is satisfied, and configures the PC parameter set corresponding to the service type other than URLLC when the predetermined condition is not satisfied. Then, terminal 300 transmits an uplink signal using the transmission power calculated using the configured PC parameter set.

As a result, in the present embodiment, terminal 300 can control the transmission power of PUSCH in accordance with the presence or absence of UCI for URLLC, so that it is possible to perform appropriate power boosting on the transmission power of PUSCH including UCI (in particular, UCI for URLLC).

In addition, when at least one UCI for URLLC satisfying the predetermined condition of Examples 1 to 4 as described above is included in the UCI to be included in and transmitted on PUSCH, terminal 300 may select a PC parameter set of PC parameter set number j=A that corresponds to URLLC, regardless of the other information included in this UCI.

Further, when UCI for URLLC satisfying the predetermined condition as described above is included in PUSCH for eMBB scheduled by DCI (e.g., DCI format 0_0 or DCI format 01 scrambled with C-RNTI or CS-RNTI), terminal 300 may select a PC parameter set of PC parameter set number j=A that corresponds to URLLC, even in the case of PUSCH for eMBB.

In addition, the present embodiment can be similarly applied to a method of configuring transmission power when UCI for URLLC is transmitted on PUSCH where the Grant-free transmission is performed.

Further, when changing the PC parameter set, terminal 300 does not need to change the number of REs of the UCI to be arranged in PUSCH. That is, terminal 300 does not need to change the parameter ($\alpha$, $\beta_{offset}^{PUSCH}$) for calculating the number of REs (Coding rate) of the UCI. Therefore, terminal 300 can configure the transmission power in accordance with the quality requirements of the UCI, by simple control of changing the PC parameter set.

Or, terminal 300 may change the number of REs of the UCI to be arranged in PUSCH with the change of the PC parameter set. In this case, terminal 300 individually configures the parameter used in calculation of UCI Coding rate, in accordance with PC parameter set, or changes Coding rate calculation by considering an increase or decrease of the transmission power due to the PC parameter set. As a result, terminal 300 can more appropriately configure the transmission power in accordance with the quality requirements of the UCI, by the control of changing the PC parameter set and changing the Coding rate calculation of the UCI.

Embodiment 3

In the present embodiment, a PUSCH uplink transmission power configuration method when UCI for URLLC is transmitted on PUSCH will be described, similarly to Embodiment 2.

In the present embodiment, a method of appropriately power-boosting the transmission power of PUSCH including UCI (in particular, UCI for URLLC), by fixing the PC parameter set regardless of the service type and introducing a UCI-dependent power adjustment parameter to the transmission power equation (see Equation 1, for example), will be described.

A communication system according to the present embodiment includes terminal 400 (see FIG. 14 which will be described later) and base station 200 (see FIG. 4, for example).

[Configuration of Terminal 400]

Figure 14:
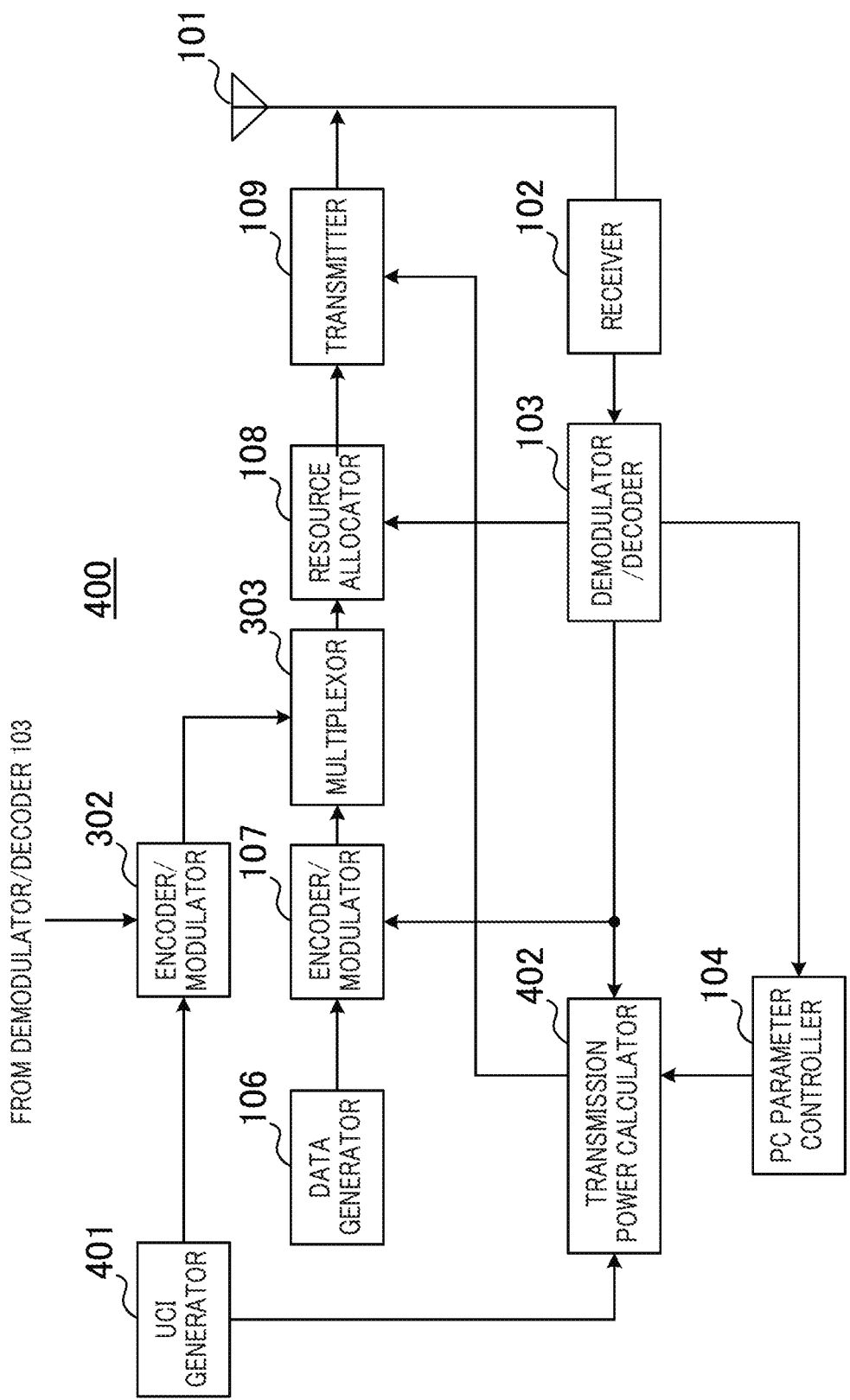
FIG. 14 is a diagram showing a configuration example of a terminal according to Embodiment 3.

FIG. 14 is a block diagram showing a configuration example of terminal 400 according to the present embodiment. In FIG. 14, the same components as those of terminal 100 (FIG. 3) of Embodiment 1 or terminal 300 (FIG. 10) of Embodiment 2 are denoted by the same reference numerals, and descriptions thereof are omitted. Specifically, in terminal 400 shown in FIG. 14, the operations of UCI generator 401 and transmission power calculator 402 are different with respect to terminal 300 shown in FIG. 10.

PC parameter controller 104 performs the same processing as in Embodiment 1. That is, PC parameter controller 104 determines PC parameter set number j to be applied to PUSCH that have been scheduled, using the DCI inputted from demodulator/decoder 103, regardless of the presence or absence of UCI.

UCI generator 401 generates UCI to be transmitted by terminal 400, and outputs the generated UCI to encoder/modulator 302. Further, UCI generator 401 outputs information relating to the UCI to be transmitted, to transmission power calculator 402.

Transmission power calculator 402 calculates a transmission power of PUSCH using PC parameter set number j configured in PC parameter controller 104, in accordance with Equation 6, for example. In Equation 6, $\Delta_{UCI}$ (UCI-dependent power adjustment parameter [dB]) is added to Equation 1.

[6]

$$P_{PUSCH,b,f,c}(i, j, q_d, l) = \min \quad \text{(Equation 6)}$$
$$\{P_{CMAX,f,c}(i), P_{O\_PUSCH,b,f,c}(j) + 10\log_{10}(2^\mu \cdot M^{PUSCH}_{RB,b,f,c}(i)) +$$
$$\alpha_{b,f,c}(j) \cdot PL_{b,f,c}(q_d) + \Delta_{TF,b,f,c}(i) + \Delta_{UCI} + f_{b,f,c}(i, l)\}$$

[Configuration of Base Station]

Since the base station according to the present embodiment has the same basic configuration as base station 200 according to Embodiment 1 or Embodiment 2, it will be described using FIG. 4. Note that the decoded reception data in base station 200 according to the present embodiment includes UCI in addition to uplink data from terminal 400 (see FIG. 14).

Hereinafter, examples of a method of power-boosting a transmission power by the UCI-dependent power adjustment parameter $\Delta_{UCI}$ with respect to PUSCH including UCI will be described.

$\Delta_{UCI}$ is calculated as shown in the following Equation 7, for example.

[7]

$$\Delta_{UCI} = 10\log_{10}\left(\frac{Q''_{UCI}}{Q'_{UCI}}\right)[dB] \quad \text{(Equation 7)}$$

Here, $Q''_{UCI}$ represents the number of REs (Required RE number) of UCI to be transmitted on PUSCH to obtain the quality required for the UCI. More specifically, $Q''_{UCI}$ represents the total number of REs of the respective Required RE numbers of ACK/NACK, CSI part1, and CSI part2 ($Q''_{ACK}$, $Q''_{CSI-1}$, and $Q''_{CSI-2}$) as shown in Equation 8.

[8]

$$Q''_{UCI} = Q''_{ACK} + Q''_{CSI-1} + Q''_{CSI-2}[RE] \quad \text{(Equation 8)}$$

Further, in Equation 7, $Q'_{UCI}$ represents the number of REs (Actual RE number) of UCI that is actually transmitted on PUSCH. More specifically, $Q'_{UCI}$ represents the total number of REs of the respective Actual RE numbers of ACK/NACK, CSI part1, and CSI part2 ($Q'_{ACK}$, $Q'_{CSI-1}$ and $Q'_{CSI-2}$) as shown in Equation 9.

[9]

$$Q'_{UCI} = Q'_{ACK} + Q'_{CSI-1} + Q'_{CSI-2}[RE] \quad \text{(Equation 9)}$$

Therefore, even when the number of REs of UCI to satisfy the quality required for the UCI cannot be arranged on PUSCH (in a case of $Q'_{UCI}$ (Actual RE number)<$Q''_{UCI}$ (Required RE number), terminal 400 can apply power boosting in accordance with the insufficient number of REs by applying the $\Delta_{UCI}$. For example, the smaller the $Q'_{UCI}$ for the $Q''_{UCI}$, the larger the $\Delta_{UCI}$, and transmission power calculator 402 configures a larger transmission power for PUSCH.

As a result, in the present embodiment, the transmission power of PUSCH can be controlled in accordance with UCI for URLLC, so that it is possible to appropriately power-boost the transmission power of PUSCH including UCI (in particular, the UCI for URLLC).

In addition, in the present embodiment, when terminal 400 does not transmit UCI on PUSCH, $\Delta_{UCI}$ may be inapplicable ($\Delta_{UCI}=0$ [dB]) in Equation 6.

Further, the present embodiment can be similarly applied to a method of configuring transmission power when UCI for URLLC is transmitted on PUSCH where the Grant-free transmission is performed.

Further, in the present embodiment, $\Delta_{UCI}$ may be applied only when UCI for URLLC is included, and $\Delta_{UCI}$ may be inapplicable ($\Delta_{UCI}=0$ [dB]) when UCI for URLLC is not included. Or, $\Delta_{UCI}$ may be applied regardless of the service type of UCI (regardless of UCI for URLLC and UCI for eMBB).

The embodiments of the present disclosure have been described above.

(1) The service type or traffic type (e.g., information indicating either URLLC or eMBB) may be included in an UL grant. In this case, base station 200 can easily indicate to terminal 100 the service type of PUSCH that have been scheduled, using the UL grant, and terminal 100 can transmit the PUSCH using a PC parameter set suitable for the service type.

(2) In the above embodiment, the case where the PC parameter set (e.g., PC parameter set number j) is changed in accordance with the predetermined condition relating to an UL grant has been described. However, in the present embodiment, the PC parameter other than PC parameter set number j (e.g., PL estimation RS number $q_d$, Closed loop process number l) may be changed in accordance with a predetermined condition relating to an UL grant.

For example, a different Closed loop process (number l) may be configured between URLLC and eMBB in accordance with a predetermined condition relating to an UL grant. Further, a different Closed loop correction value may be configured between URLLC and eMBB in accordance with a predetermined condition relating to an UL grant. For example, when a Closed loop correction value included in DCI comprises 2 bits (4 patterns), a larger correction value in URLLC than in eMBB may be applied, such as {+3, −1, 0, +1} for eMBB and {+6, −2, 0, +2} for URLLC. In this case, terminal 100 can perform Closed loop transmission power control in accordance with the quality requirements of a service type. Further, a parameter configured in accordance with a predetermined condition relating to an UL grant is not limited to the Closed loop process, and may be another parameter.

(3) In the above embodiment, PUSCH transmission power control has been described. However, an embodiment of the present disclosure can also be applied to an uplink channel other than PUSCH (e.g., Physical Uplink Control Channel (PUCCH)).

PUCCH transmission power control is performed, for example, according to the following Equation 10 (see NPL 3, for example).

[10]

$$P_{PUCCH,b,f,c}(i, q_u, q_d, l) = \min$$ (Equation 10)

$$\{P_{CMAX,f,c}(i), P_{O\_PUCCH,b,f,c}(q_u) + 10\log_{10}(2^\mu \cdot M_{RB,b,f,c}^{PUCCH}(i)) +$$

$$PL_{b,f,c}(q_d) + \Delta_{F_{PUCCH}}(F) + \Delta_{TF,b,f,c}(i) + g_{b,f,c}(i, l)\}$$

In Equation 10, $P_{PUCCH,b,f,c}$(i, qu, qd, l) represents PUCCH transmission power [dBm] at UL Bandwidth part (BWP) number "b," Carrier number "f," serving cell number "c," Slot number "i," PC parameter number "qu," PL estimation RS number "qd," and Closed loop process number "l." $P_{O\_PUCCH,b,f,c}(q_u)$ represents target reception power [dBm] (Parameter value) at PC parameter number qu. $2\mu \cdot M_{RB,b,f,c}^{PUCCH}(i)$ represents PUSCH transmission bandwidth [PRB] obtained by normalizing SCS to be applied to PUSCH at Slot number i with reference to 15 KHz SCS. $PL_{b,f,c}(q_d)$ represents Pass Loss [dB] measured by a terminal from an RS of RS number $q_d$. $\Delta_{F\_PUCCH}$ (F) represents an offset [dB] dependent on a PUCCH format. $\Delta_{TF,b,f,c}(i)$ represents an offset [dB] dependent on MCS of data to be transmitted at Slot number i. $g_{b,f,c}$(i, l) represents Closed loop correction value [dB] at Slot number i and Closed loop process number l.

For example, with respect to PUCCH for transmitting ACK/NACK to downlink data channel (PDSCH: Physical Downlink Shared Channel), PC parameter number $q_u$ can be indicated from base station 200 to terminal 100 using MAC-CE information of PDSCH (more specifically, PUCCH-Spatial-relation-info). However, with respect to PUCCH for performing SR transmission, there is no accompanying PDSCH, so that there is no explicit indication of PC parameter value from base station 200 to terminal 100.

Regarding such a PUCCH transmission where there is no explicit indication of PC parameter value, terminal 100 can switch a PC parameter value (e.g., PC parameter number $q_u$) in accordance with a predetermined condition relating to an UL grant, similarly to the above embodiment. For example, a PC parameter value corresponding to a high transmission power value compared to SR transmission of a service type other than URLLC may be configured for a PUCCH that performs SR transmission for URLLC. As a result, SR for URLLC can be transmitted with high quality, and the requirements of URLLC can be satisfied. In this way, the same effects as PUSCH transmission can be obtained for PUCCH transmission as well.

(4) In the present embodiment, the service type having different requirements such as reliability or low latency, etc. (in other words, service, traffic type, Logical channel type, use case, or usage scenario) is not limited to URLLC or eMBB. For example, one embodiment of the present disclosure can be applied to mMTC transmission, and similar effects can be obtained.

(5) The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and Internet of Things ("IoT"; every "things" that may exist on networks)).

In addition to data communication via cellular systems, wireless LAN systems, communication satellite systems and/or the like, communication includes data communication via a combination of these systems.

Further, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A terminal of the present disclosure includes: circuitry, which, in operation, configures a first power control parameter corresponding to a first service when a predetermined condition relating to a control channel to be used for transmission of assignment information of an uplink signal is satisfied, and configures a second power control parameter corresponding to a second service when the predetermined condition is not satisfied; and transmission circuitry, which, in operation, transmits the uplink signal using a transmission power calculated using the first power control parameter or the second power control parameter.

In the terminal of the present disclosure, the predetermined condition is that a payload size of a format to be used for the control channel is different from a predetermined size.

In the terminal of the present disclosure, t the predetermined condition is that a payload size of a format to be used for the control channel is less than a predetermined size.

In the terminal of the present disclosure, the predetermined condition is that a scrambling sequence to be used for the control channel is different from a predetermined sequence.

In the terminal of the present disclosure, the predetermined condition is that the control channel is a control channel that is received at the terminal within a predetermined time period after a signal requesting scheduling of the first service is transmitted from the terminal.

In the terminal of the present disclosure, the predetermined condition is that the control channel is a control channel that the terminal receives first after a signal requesting scheduling of the first service is transmitted from the terminal.

In the terminal of the present disclosure, the predetermined condition is that the control channel indicates that a resource for use in an initial transmission of the uplink signal is a retransmission in a pre-configured transmission method.

In the terminal of the present disclosure, the predetermined condition is that a time period until the terminal transmits the uplink signal after the terminal receives the control channel is within a predetermined time.

In the terminal of the present disclosure, the predetermined condition is that a number of transmission symbols of the uplink signal indicated in the control channel is less than or equal to a predetermined value.

In the terminal of the present disclosure, the predetermined condition is that a detection period of the control channel in the terminal is less than or equal to a predetermined value.

In the terminal of the present disclosure, the predetermined condition is that a table indicating a coding and modulation scheme to be used in the control channel is different from a predetermined table.

In the terminal of the present disclosure, the predetermined condition is that uplink control information included in the uplink signal is a response signal to downlink data of the first service.

In the terminal of the present disclosure, the predetermined condition is that a time period until the terminal transmits the uplink signal including a response signal to downlink data after the terminal receives the downlink data is within a predetermined time.

In the terminal of the present disclosure, the predetermined condition is that uplink control information included in the uplink signal is channel state information calculated using a target error rate that is less than or equal to a predetermined threshold value.

In the terminal of the present disclosure, a total error rate of downlink data and a response signal to the downlink data has a constant value, and the predetermined condition is that uplink control information included in the uplink signal is a response signal to the downlink data of the second service.

In the terminal of the present disclosure, the predetermined condition is that a number of resources of uplink control information included in the uplink signal is equal to or greater than a predetermined threshold value.

In the terminal of the present disclosure, the predetermined condition is that a ratio of a number of resources of uplink control information included in the uplink signal to a number of resources of an entirety of the uplink signal is larger than a predetermined threshold value.

In the terminal of the present disclosure, the transmission power calculated using the first power control parameter is greater than the transmission power calculated using the second power control parameter.

A transmission method of the present disclosure includes: configuring a first power control parameter corresponding to a first service when a predetermined condition relating to a control channel to be used for transmission of assignment information of an uplink signal is satisfied, and configuring a second power control parameter corresponding to a second service when the predetermined condition is not satisfied; and transmitting the uplink signal using a transmission power calculated using the first power control parameter or the second power control parameter.

The disclosure of Japanese Patent Application No. 2018-090120, filed May 8, 2018 and Japanese Patent Application No. 2018-135011, filed Jul. 18, 2018, each including the specification, drawings, and abstract, is incorporated herein by reference in its entirety.

INDUSTRIAL APPLICABILITY

One embodiment of the present disclosure is useful in mobile communication systems.

REFERENCE SIGNS LIST

100, 300, 400 Terminal
101, 205 Antenna 102, 206 Receiver
103, 207 Demodulator/decoder
104, 304 PC parameter controller
105, 402 Transmission power calculator
106 Data generator
107, 203, 302 Encoder/modulator
108 Resource allocator
109, 204 Transmitter
200 Base station
201 Scheduler
202 Control information generator
301, 401 UCI generator
303 Multiplexor

The invention claimed is:

1. A terminal comprising:
reception circuitry, which, in operation, receives an uplink grant;
circuitry, which, in operation,
determines an uplink channel scheduled by the uplink grant utilizes a first service or a second service based on a detection period for detecting the uplink grant, wherein
the first service is Ultra-Reliable and Low Latency Communications (URLLC),
in a case where the detection period of the uplink grant is less than or equal to a determined value, the circuitry, in operation, determines the uplink channel scheduled by the uplink grant utilizes the first service, selects a first power control parameter that corresponds to the first service, and calculates a transmission power using the first power control parameter, and
in a case where the detection period of the uplink grant is greater than the determined value, the circuitry, in operation, determines the uplink channel scheduled by the uplink grant utilizes the second service, selects a second power control parameter that corresponds to the second service and is different from the first power control parameter, and calculates the transmission power using the second power control parameter; and
transmission circuitry, which, in operation, transmits an uplink signal on the uplink channel using the calculated transmission power.

2. A terminal comprising:
circuitry, which, in operation,
generates uplink control information, wherein the uplink control information is included in an uplink signal,
determines whether or not to perform power boosting for transmission of the uplink signal based on a number of resource elements for the uplink control information, wherein
in a case where the number of resource elements for the uplink control information is equal to or greater than a determined value, the circuitry, in operation, determines to perform power boosting for the transmission of the uplink signal, selects a first power control parameter that corresponds to a first service, and calculates a transmission power using the first power control parameter,
in a case where the number of resource elements for the uplink control information is less than the determined value, the circuitry, in operation, determines to not perform power boosting for the transmission of the uplink signal, selects a second power control parameter that corresponds to a second service, and calculates the transmission power using the second power control parameter, wherein the transmission power calculated using the first power control parameter is greater than the transmission power calculated using the second power control parameter, and
the first service is Ultra-Reliable and Low Latency Communications (URLLC); and
transmission circuitry, which, in operation, transmits the uplink signal using the calculated transmission power.

3. The terminal according to claim 1, wherein the transmission power calculated using the first power control parameter is greater than the transmission power calculated using the second power control parameter.

4. A transmission method comprising:
receiving, by a terminal, an uplink grant;
determining, by the terminal, an uplink channel scheduled by the uplink grant utilizes a first service or a second service based on a detection period for detecting the uplink grant, wherein
the first service is Ultra-Reliable and Low Latency Communications (URLLC),
in a case where the detection period of the uplink grant is less than or equal to a determined value, the terminal determines the uplink channel scheduled by the uplink grant utilizes the first service, selects a first power control parameter that corresponds to the first service, and calculates a transmission power using the first power control parameter, and
in a case where the detection period of the uplink grant is greater than the determined value, the terminal determines the uplink channel scheduled by the uplink grant utilizes the second service, selects a second power control parameter that corresponds to the second service and is different from the first power control parameter, and calculates the transmission power using the second power control parameter; and
transmitting, by the terminal, an uplink signal on the uplink channel using the calculated transmission power.

5. The terminal according to claim 3, wherein the second service is a service different from URLLC.

6. The terminal according to claim 5, wherein the second service is enhanced mobile broadband (eMBB).

7. The terminal according to claim 1, wherein the first power control parameter includes a first set number that indicates a first power control parameter set, and the second power control parameter includes a second set number that indicates a second power control parameter set.

8. The terminal according to claim 1 wherein the first power control parameter and the second power control parameter are omitted from the uplink grant.

9. The terminal according to claim 1 wherein the second service is a service different from URLLC.

10. The terminal according to claim 1 wherein the circuitry, in operation,
determines whether the uplink channel scheduled by the uplink grant utilizes the first service or the second service based on a payload size of the uplink grant, wherein
in a case where the payload size of the uplink grant is different from a payload size of a DCI format, the circuitry, in operation, determines the uplink channel scheduled by the uplink grant utilizes the first service, selects a third power control parameter that corresponds to the first service, and calculates the transmission power using the third power control parameter, and in a case where the payload size of the uplink grant is equal to a payload size of the DCI format, the circuitry, in operation, determines the uplink channel scheduled by the uplink grant utilizes the second service, selects a fourth power control parameter that corresponds to the second service and is different from the third power control parameter, and calculates the transmission power using the fourth power control parameter.

11. The terminal according to claim 1 wherein the circuitry, in operation, determines whether the uplink channel scheduled by the uplink grant utilizes the first service or the second service based on a scrambling sequence used in the uplink grant, wherein in a case where the scrambling sequence used in the uplink grant is different from a determined scrambling sequence, the circuitry, in operation, determines the uplink channel scheduled by the uplink grant utilizes the first service, selects a third power control parameter that corresponds to the first service, and calculates the transmission power using the third power control parameter, and in a case where the scrambling sequence used in the uplink grant is equal to a determined scrambling sequence, the circuitry, in operation, determines the uplink channel scheduled by the uplink grant utilizes the second service, selects a fourth power control parameter that corresponds to the second service and is different from the third power control parameter, and calculates the transmission power using the fourth power control parameter.

12. The terminal according to claim 2 wherein the second service is a service different from URLLC.

* * * * *